(12) United States Patent
Park

(10) Patent No.: US 11,991,484 B2
(45) Date of Patent: May 21, 2024

(54) ELECTRONIC APPARATUS AND CONTROLLING METHOD THEREOF

(71) Applicant: SAMSUNG ELECTRONICS CO., LTD., Suwon-si (KR)

(72) Inventor: Kihong Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 17/590,245

(22) Filed: Feb. 1, 2022

(65) Prior Publication Data

US 2023/0010713 A1 Jan. 12, 2023

Related U.S. Application Data

(63) Continuation of application No. PCT/KR2021/017123, filed on Nov. 22, 2021.

(30) Foreign Application Priority Data

Jul. 12, 2021 (KR) .......................... 10-2021-0091211

(51) Int. Cl.
   *H04N 9/31* (2006.01)
   *G01S 17/08* (2006.01)
   *G03B 21/14* (2006.01)

(52) U.S. Cl.
   CPC ........... *H04N 9/3188* (2013.01); *G01S 17/08* (2013.01); *G03B 21/142* (2013.01); *H04N 9/3185* (2013.01); *H04N 9/3194* (2013.01)

(58) Field of Classification Search
   CPC .. H04N 9/3188; H04N 9/3185; H04N 9/3194; H04N 9/3102; H04N 9/317;
   (Continued)

(56) References Cited

U.S. PATENT DOCUMENTS

| | | |
|---|---|---|
| 7,104,653 B2 | 9/2006 | Moriwaki et al. |
| 7,347,564 B2 | 3/2008 | Matsumoto et al. |

(Continued)

FOREIGN PATENT DOCUMENTS

| | | |
|---|---|---|
| JP | 11-95324 | 4/1999 |
| JP | 3914891 B2 | 5/2007 |

(Continued)

OTHER PUBLICATIONS

International Search Report and Written Opinion dated Apr. 7, 2022 from International Application No. PCT/KR2021/017123.

*Primary Examiner* — Robert J Hance
*Assistant Examiner* — Humam M Satti
(74) *Attorney, Agent, or Firm* — STAAS & HALSEY LLP

(57) ABSTRACT

An electronic apparatus is provided. The electronic apparatus includes: a memory configured to store an image; a sensor part including at least one sensor; a projection part including a projection lens configured to output the image to a projection surface; and a processor configured to acquire distance information from the electronic apparatus to the projection surface through the sensor part, acquire output size information of the image based on the acquired distance information, acquire projection surface information corresponding to a bend of the projection surface through the sensor part, acquire movement information of the projection lens based on the output size information of the image and the projection surface information, and control the projection part to output the image based on the movement information.

8 Claims, 33 Drawing Sheets

(58) Field of Classification Search
CPC ..... H04N 9/3173; G01S 17/08; G01S 7/4802; G01S 7/4808; G01S 17/88; G01S 17/42; G03B 17/54; G03B 21/53; G03B 21/58–60; G03B 21/12–147; G03B 21/2046; G03B 21/26; G03B 21/30; G03B 21/34; G03B 21/36; G03B 21/43; G03B 21/56–58; G06T 3/005

See application file for complete search history.

(56) References Cited

U.S. PATENT DOCUMENTS

| | | | |
|---|---|---|---|
| 9,596,441 B2 | 3/2017 | Shin | |
| 9,817,305 B2 | 11/2017 | Kim et al. | |
| 10,979,682 B2 | 4/2021 | Ichieda | |
| 11,503,260 B2 | 11/2022 | Ichieda | |
| 2009/0310100 A1* | 12/2009 | Kondo | G03B 17/48 382/254 |
| 2012/0182416 A1* | 7/2012 | Kawaguchi | H04N 9/3185 353/69 |
| 2013/0083167 A1* | 4/2013 | Miyauchi | H04N 5/74 348/46 |
| 2014/0285725 A1* | 9/2014 | Furui | H04N 9/3185 348/745 |
| 2016/0212391 A1* | 7/2016 | Xiong | H04N 9/31 |
| 2019/0155128 A1* | 5/2019 | Shimizu | G02B 13/16 |
| 2020/0007835 A1 | 1/2020 | Ichieda | |
| 2020/0184932 A1* | 6/2020 | Fujimori | H04N 9/3179 |
| 2021/0025699 A1* | 1/2021 | Shishido | H04N 9/3179 |
| 2021/0176442 A1 | 6/2021 | Ichieda | |

FOREIGN PATENT DOCUMENTS

| | | |
|---|---|---|
| JP | 2008-193280 A | 8/2008 |
| JP | 2013-225745 | 10/2013 |
| JP | 2020-178221 | 10/2020 |
| JP | 6784280 | 11/2020 |
| KR | 10-0546639 B1 | 1/2006 |
| KR | 10-0739824 B1 | 7/2007 |
| KR | 10-2010-0010991 | 2/2010 |
| KR | 10-1391377 B1 | 4/2014 |
| KR | 10-2015-0075664 | 7/2015 |
| KR | 10-2015-0080678 A | 7/2015 |
| KR | 10-2018-0003269 | 1/2018 |
| KR | 10-2124475 | 6/2020 |
| KR | 10-2020-0102080 A | 8/2020 |

* cited by examiner

FIG. 7

705 — $\text{Throw ratio} = \dfrac{d}{w}$

710 — $w = \dfrac{d}{\text{Throw ratio}}$

715 —

| Throw ratio | w | | | |
|---|---|---|---|---|
| | d=100cm | d=150cm | d=200cm | d=250cm |
| 0.5 | 200 | 300 | 400 | 500 |
| 1 | 100 | 150 | 200 | 250 |
| 1.5 | 66.67 | 100 | 133.33 | 166.67 |
| 2 | 50 | 75 | 100 | 125 |
| 2.5 | 40 | 60 | 80 | 100 |

720 — $w:h = A:B$

725 — $h = \dfrac{w*B}{A}$

FIG. 12
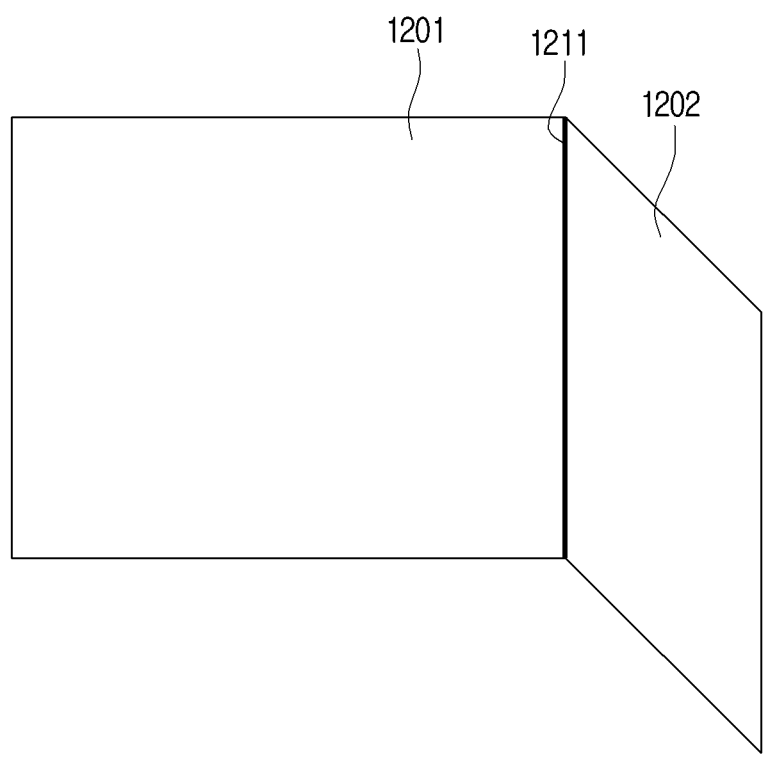
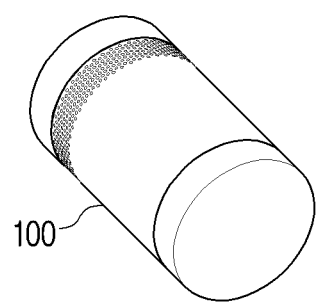

FIG. 13
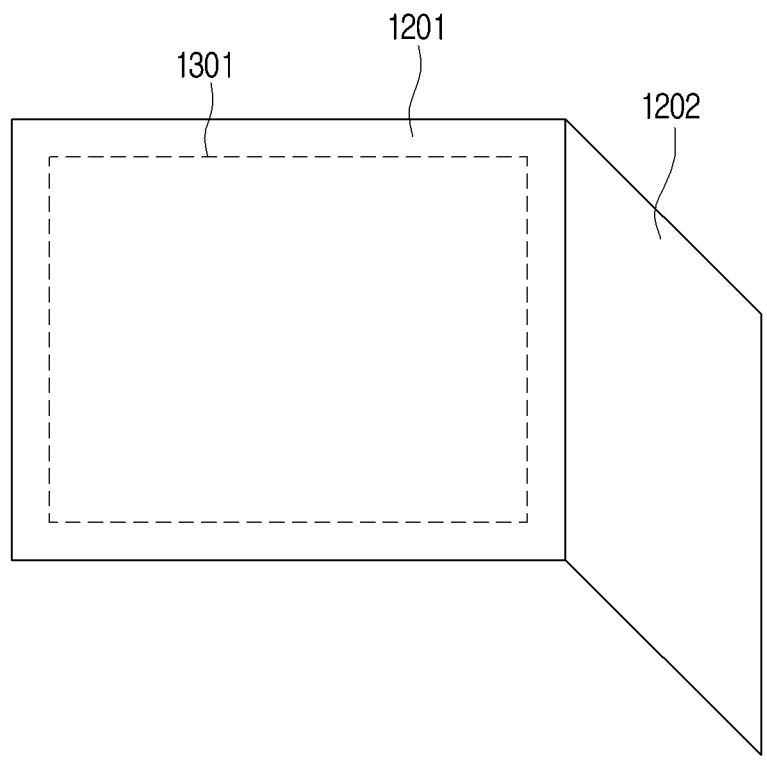
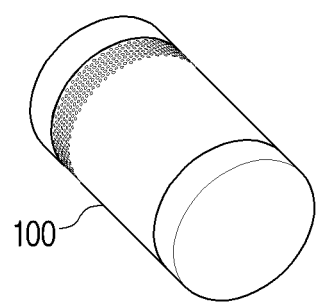

FIG. 14
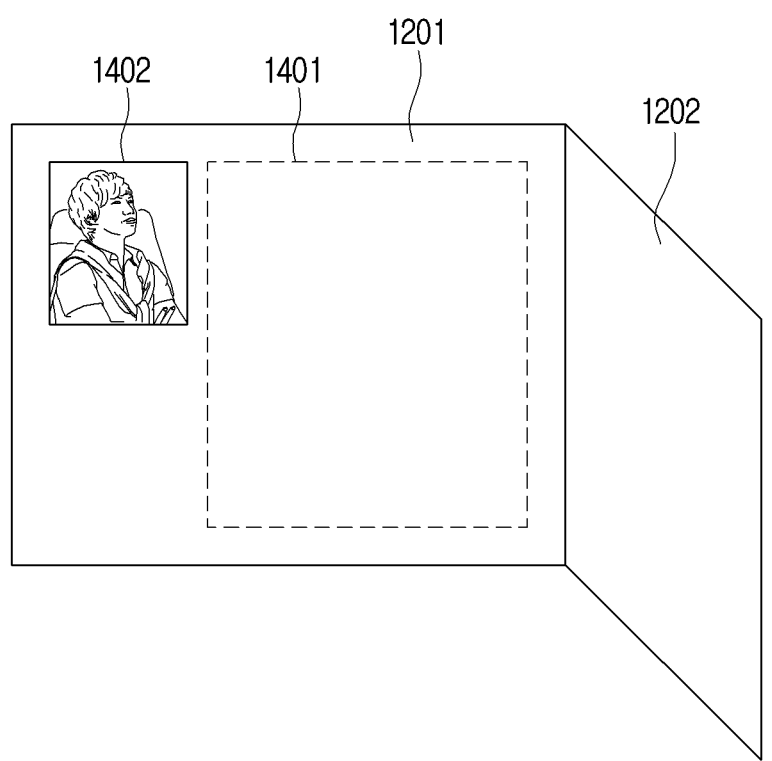
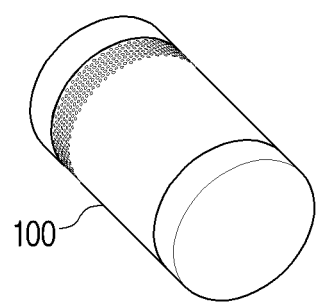

ELECTRONIC APPARATUS AND CONTROLLING METHOD THEREOF

CROSS-REFERENCE TO RELATED APPLICATION

This application is a continuation application, under 35 U.S.C. § 111(a), of International Application No. PCT/KR2021/017123, filed on Nov. 22, 2021 which claims priority under 35 U.S.C. §119 to Korean Patent Application No. 10-2021-0091211, filed on Jul. 12, 2021. The contents of PCT Application PCT/KR2021/017123 filed on Nov. 21, 2021 and Korean Patent Application No. 10-2021-0091211 filed on Jul. 12, 2021 are incorporated by reference herein in their entirety.

FIELD

Apparatuses and methods consistent with the disclosure relate to an electronic apparatus outputting an image through a projection part and a controlling method thereof, and more particularly, to an electronic apparatus controlling an image to be appropriately output to a projection surface including a bend and a controlling method thereof.

BACKGROUND

A projector may output an image to a projection surface through a projection part. Here, the projection surface has a very wide entire area, such that only a flat portion may exist on the projection surface, but in some cases, a space may be narrow, such that a bend may occur.

For example, the projection surface may be divided into a plurality of areas (a front surface or a side surface). When the image is output over (in an overlapping form in) the plurality of areas, there may be a problem that distortion occurs.

Here, when only existing correction for reducing a size of the image is performed, a problem that the image becomes excessively small may occur. In addition, when a user directly and manually moves the projector, fine adjustment may be difficult, and there may be a problem that the user is inconvenient.

SUMMARY

The disclosure provides an electronic apparatus outputting an image based on movement information for moving a projection lens using a size of an output image and projection surface information, and a controlling method thereof.

According to an embodiment of the disclosure, an electronic apparatus includes: a memory configured to store an image; a sensor part including at least one sensor; a projection part including a projection lens configured to output the image to a projection surface; and a processor configured to acquire distance information from the electronic apparatus to the projection surface through the sensor part, acquire output size information of the image to project the image onto the pro1jection surface based on the acquired distance information, acquire projection surface information corresponding to a bend of the projection surface through the sensor part, acquire movement information of the projection lens based on the output size information of the image and the projection surface information, and control the projection part to output the image based on the movement information.

The sensor part may include a distance sensor, the movement information may include at least one of a movement direction or a movement distance, and the processor may be configured to control the projection part to move the projection lens based on the movement direction and the movement distance.

The processor may be configured to identify a bend position of the projection surface, divide the projection surface into a first area and a second area based on the bend position, identify one of the first area or the second area as an output area, and control the projection part to output the image to the identified output area.

The processor may be configured to acquire a size of the first area and a size of the second area, and identify an area having a greater size, of the first area and the second area as the output area.

The processor may be configured to identify the first area as the output area based on a size of a first portion of the image output to the first area being greater than a size of a second portion of the image output to the second area.

The processor may be configured to acquire a size of the output area, change a size of the image based on the size of the output area, and control the projection part to output the changed image to the output area.

The processor may be configured to change the size of the image while maintaining an aspect ratio of the image.

The processor may be configured to acquire a size of the output area, enlarge the size of the image based on the size of the output area being greater than an output size of the image, and reduce the size of the image based on the size of the output area being smaller than the output size of the image.

The processor may be configured to acquire the movement information based on a movement limit value corresponding to the projection lens, and control the projection part to output a user interface (UI) for guiding a position of the electronic apparatus based on a movement distance included in the movement information being greater than the movement limit value.

The sensor part may include an image sensor, and the processor may be configured to identify whether or not the image is output to both a first area and a second area based on a captured image acquired through the image sensor based on the projection surface including the first area and the second area, and acquire the movement information of the projection lens based on the image being output to both the first area and the second area.

According to another embodiment of the disclosure, a controlling method of an electronic apparatus including a projection lens for outputting an image to a projection surface includes: acquiring distance information from the electronic apparatus to the projection surface; acquiring output size information of the image based on the acquired distance information; acquiring projection surface information corresponding to a bend of the projection surface; acquiring movement information of the projection lens based on the output size information of the image and the projection surface information; and outputting the image based on the movement information.

The movement information may include at least one of a movement direction or a movement distance, and the controlling method may further include moving the projection lens based on the movement direction and the movement distance.

The controlling method may further include: identifying a bend position of the projection surface; dividing the projection surface into a first area and a second area based on the bend position; and identifying one of the first area or the second area as an output area, wherein in the outputting of the image, the image is output to the identified output area.

In the identifying of one of the first area and the second area as the output area, a size of the first area and a size of the second area may be acquired, and an area having a greater size, of the first area and the second area may be identified as the output area.

In the identifying of one of the first area and the second area as the output area, the first area may be identified as the output area based on a size of a first portion of the image output to the first area greater than a size of a second portion of the image output to the second area.

The controlling method may further include acquiring a size of the output area and changing a size of the image based on the size of the output area, wherein in the outputting of the image, the changed image is output to the output area.

In the changing of the size of the image, the size of the image may be changed while maintaining an aspect ratio of the image.

The controlling method may further include acquiring a size of the output area, enlarging the size of the image based on the size of the output area being greater than an output size of the image, and reducing the size of the image based on the size of the output area being smaller than the output size of the image.

In the acquiring of the movement information, movement information may be acquired based on a movement limit value corresponding to the projection lens, and the controlling method may further include outputting a user interface (UI) for guiding a position of the electronic apparatus based on a movement distance included in the movement information being greater than the movement limit value.

Meanwhile, in the acquiring of the movement information, it may be identified whether or not the image is output to both a first area and a second area based on a captured image acquired through an image sensor based on the projection surface including the first area and the second area, and the movement information of the projection lens may be acquired based on the image being output to both the first area and the second area.

DESCRIPTION OF DRAWINGS

FIG. 7 is a view for describing an operation of acquiring size information of an output image;

FIG. 12 is a view for describing an operation of dividing a projection surface into a plurality of areas;

FIG. 13 is a view for describing an operation of identifying one of the plurality of areas as an output area;

FIG. 14 is a view for describing an operation of identifying an area excluding an object on the projection surface as an output area;

DETAILED DESCRIPTION

Figure 1:
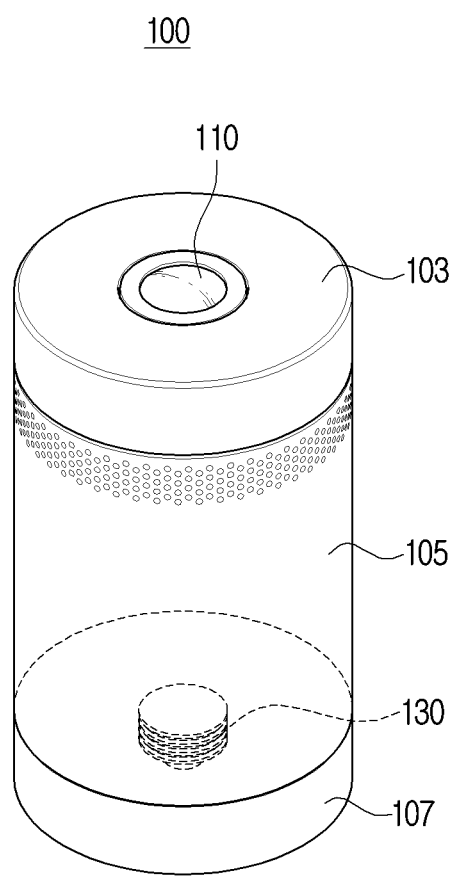
FIG. 1 is a perspective view illustrating an exterior of an electronic apparatus according to an embodiment of the disclosure.

Hereinafter, the disclosure will be described in detail with reference to the accompanying drawings.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure are to be defined on the basis of the meaning of the terms and the contents throughout the disclosure rather than simple names of the terms.

In the specification, an expression "have", "may have", "include", "may include", or the like, indicates existence of a corresponding feature (e.g., a numerical value, a function, an operation, a component such as a part, or the like), and does not exclude existence of an additional feature.

An expression "at least one of A and/or B" is to be understood to represent "A" or "B" or "one of A and B".

Expressions "first", "second", or the like, used in the specification may indicate various components regardless of a sequence and/or importance of the components, will be used only to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component).

Singular forms are intended to include plural forms unless the context clearly indicates otherwise. It should be understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In the disclosure, a "module" or a "~er/or" may perform at least one function or operation, and be implemented as hardware or software or be implemented as a combination of hardware and software. In addition, a plurality of "modules" or a plurality of "~ers/~ors" may be integrated in at least one module and be implemented as at least one processor (not illustrated) except for a "module" or a "~er/or" that needs to be implemented as specific hardware.

In the disclosure, a term "user" may refer to a person using an electronic apparatus or an apparatus (for example, an artificial intelligence electronic apparatus) using an electronic apparatus.

Hereinafter, an embodiment of the disclosure will be described in detail with reference to the accompanying drawings.

FIG. 1 is a perspective view illustrating an exterior of an electronic apparatus 100 according to an embodiment of the disclosure.

Referring to FIG. 1, the electronic apparatus 100 may include a head 103, a main body 105, a projection lens 110, a connector 130, or a cover 107.

The electronic apparatus 100 may be devices in various forms. In particular, the electronic apparatus 100 may be a projector device that enlarges and projects an image to a wall or a screen, and the projector device may be an LCD projector or a digital light processing (DLP) type projector that uses a digital micromirror device (DMD).

Also, the electronic apparatus 100 may be a display device for households or for an industrial use. Alternatively, the electronic apparatus 100 may be an illumination device used in everyday lives, or an audio device including an audio module, and it may be implemented as a portable communication device (e.g.: a smartphone), a computer device, a portable multimedia device, a wearable device, or a home appliance, etc. Meanwhile, the electronic apparatus 100 according to an embodiment of the disclosure is not limited to the aforementioned devices, and the electronic apparatus 100 may be implemented as an electronic apparatus 100 equipped with two or more functions of the aforementioned devices. For example, according to a manipulation of a processor, a projector function of the electronic apparatus 100 is turned off, and an illumination function or a speaker function is turned on, and the electronic apparatus 100 may be utilized as a display device, an illumination device, or an audio device. Also, the electronic apparatus 100 may include a microphone or a communication device, and may be utilized as an AI speaker.

The main body 105 is a housing constituting the exterior, and it may support or protect the components of the electronic apparatus 100 (e.g., the components illustrated in FIG. 2A and FIG. 2B) that are arranged inside the main body 105. The shape of the main body 105 may have a structure close to a cylindrical shape as illustrated in FIG. 1. However, the shape of the main body 105 is not limited thereto, and according to the various embodiments of the disclosure, the main body 105 may be implemented as various geometrical shapes such as a column, a cone, a sphere, etc. having polygonal cross sections.

The size of the main body 105 may be a size that a user can grip or move with one hand, and the main body 105 may be implemented as a micro size so as to be easily carried, or it may be implemented as a size that can be held on a table or that can be coupled to an illumination device.

Also, the material of the main body 105 may be implemented as a matt metallic or synthetic resin such that a user's fingerprint or dust does not smear it. Alternatively, the exterior of the main body 105 may consist of a slick glossy material.

In the main body 105, a friction area may be formed in a partial area of the exterior of the main body 105 such that a user can grip and move the main body 105. Alternatively, in the main body 105, a bent gripping part or a support 108a (refer to FIG. 3) that can be gripped by a user may be provided in at least a partial area.

The projection lens 110 is formed on one surface of the main body 105, and is formed to project a light that passed through a lens array to the outside of the main body 105. The projection lens 110 according to the various embodiments of the disclosure may be an optical lens which was low-dispersion coated for reducing chromatic aberration. Also, the projection lens 110 may be a convex lens or a condensing lens, and the projection lens 110 according to an embodiment of the disclosure may adjust the focus by adjusting locations of a plurality of sub lenses.

The head 103 may be provided to be coupled to one surface of the main body 105, and it can support and protect the projection lens 110. Also, the head 103 may be coupled to the main body 105 so as to be swiveled within a predetermined angle range based on one surface of the main body 105.

The head 103 may be automatically or manually swiveled by a user or the processor, and it may freely adjust a projection angle of the projection lens 110. Alternatively, although not illustrated in the drawings, the head 103 may include a neck that is coupled to the main body 105 and that extends from the main body 105, and the head 103 may adjust a projection angle of the projection lens 110 as it is tipped or tilted.

The electronic apparatus 100 may project a light or an image to a desired location by adjusting an emission angle of the projection lens 110 while adjusting the direction of the head 103 in a state wherein the location and the angle of the main body 105 are fixed. Also, the head 103 may include a handle that a user can grip after rotating in a desired direction.

On an outer circumferential surface of the main body 105, a plurality of openings may be formed. Through the plurality of openings, audio output from an audio output part may be output to the outside of the main body 105 of the electronic apparatus 100. The audio output part may include a speaker, and the speaker may be used for general uses such as reproduction of multimedia or reproduction of recording, output of a voice, etc.

According to an embodiment of the disclosure, a radiation fan (not shown) may be provided inside the main body 105, and when the radiation fan (not shown) is operated, air or heat inside the main body 105 may be discharged through the plurality of openings. Accordingly, the electronic apparatus 100 may discharge heat generated by the driving of the electronic apparatus 100 to the outside, and prevent overheating of the electronic apparatus 100.

The connector 130 may connect the electronic apparatus 100 with an external device and transmit or receive electronic signals, or it may be supplied with power from the outside. The connector 130 according to an embodiment of the disclosure may be physically connected with an external device. Here, the connector 130 may include an input/output interface, and it may connect communication with an external device, or it may be supplied with power via wire or wirelessly. For example, the connector 130 may include an HDMI connection terminal, a USB connection terminal, an SD card accommodating groove, an audio connection terminal, or a power consent. Alternatively, the connector 130 may include a Bluetooth, Wi-Fi, or wireless charge connection module that is connected with an external device wirelessly.

Also, the connector 130 may have a socket structure connected to an external illumination device, and it may be connected to a socket accommodating groove of an external illumination device and supplied with power. The size and specification of the connector 130 of a socket structure may be implemented in various ways in consideration of an accommodating structure of an external device that can be coupled. For example, according to the international standard E26, a diameter of a joining part of the connector 130 may be implemented as 26 mm, and in this case, the electronic apparatus 100 may be coupled to an external illumination device such as a stand in place of a light bulb that is generally used. Meanwhile, when coupled to a conventional socket located on a ceiling, the electronic apparatus 100 has a structure of being projected from up to down, and in case the electronic apparatus 100 does not rotate by socket-coupling, the screen cannot be rotated, either. Accordingly, in case power is supplied as the electronic apparatus 100 is socket-coupled, in order that the electronic apparatus 100 can rotate, the head 103 is swiveled on one surface of the main body 105 and adjusts an emission angle while the electronic apparatus 100 is socket-coupled to a stand on a ceiling, and accordingly, the screen can be emitted to a desired location, or the screen can be rotated.

The connector 130 may include a coupling sensor, and the coupling sensor may sense whether the connector 130 and an external device are coupled, a coupled state, or a subject for coupling, etc. and transmit the information to the processor, and the processor may control the driving of the electronic apparatus 100 based on the transmitted detection values.

The cover 107 may be coupled to or separated from the main body 105, and it may protect the connector 130 such that the connector 130 is not exposed to the outside at all times. The shape of the cover 107 may be a shape of being continued to the main body 105 as illustrated in FIG. 1. Alternatively, the shape may be implemented to correspond to the shape of the connector 130. Also, the cover 107 may support the electronic apparatus 100, and the electronic apparatus 100 may be coupled to the cover 107, and may be used while being coupled to or held on an external holder.

In the electronic apparatus 100 according to the various embodiments of the disclosure, a battery may be provided inside the cover 107. The battery may include, for example, a primary cell that cannot be recharged, a secondary cell that can be recharged, or a fuel cell.

Although not illustrated in the drawings, the electronic apparatus 100 may include a camera module, and the camera module may photograph still images and moving images. According to an embodiment of the disclosure, the camera module may include one or more lenses, an image sensor, an image signal processor, or a flash.

Also, although not illustrated in the drawings, the electronic apparatus 100 may include a protection case (not shown) such that the electronic apparatus 100 can be easily carried while being protected. Alternatively, the electronic apparatus 100 may include a stand (not shown) that supports or fixes the main body 105, and a bracket (not shown) that can be coupled to a wall surface or a partition.

In addition, the electronic apparatus 100 may be connected with various external devices by using a socket structure, and provide various functions. As an example, the electronic apparatus 100 may be connected with an external camera device by using a socket structure. The electronic apparatus 100 may provide an image stored in a connected camera device or an image that is currently being photographed by using a projection part 111. As another example, the electronic apparatus 100 may be connected with a battery module by using a socket structure, and supplied with power. Meanwhile, the electronic apparatus 100 may be connected with an external device by using a socket structure, but this is merely an example, and the electronic apparatus 100 may be connected with an external device by using another interface (e.g., a USB, etc.).

Figure 2A:
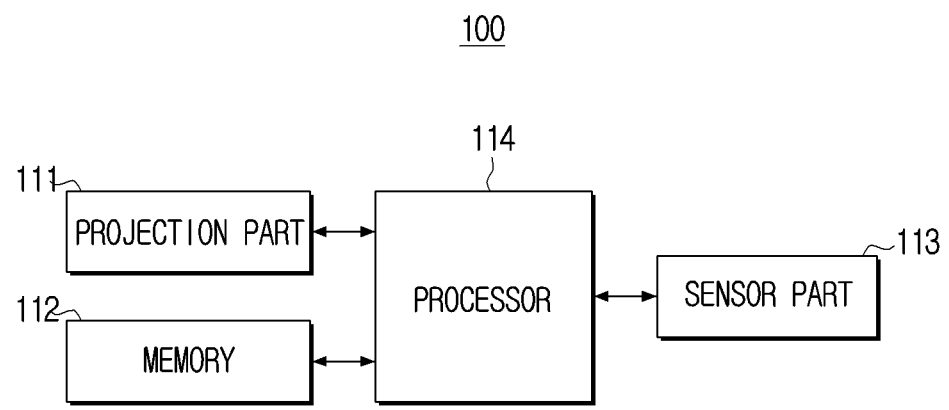
FIG. 2A is a block diagram illustrating the electronic apparatus according to an embodiment of the disclosure.

FIG. 2A is a block diagram illustrating the electronic apparatus according to an embodiment of the disclosure.

Referring to FIG. 2A, the electronic apparatus 100 may include a projection part 111, a memory 112, a sensor part 113, and a processor 114.

The projection part 111 may perform a function of outputting an image to a projection surface. A detailed description related to the projection part 111 will be described with reference to FIG. 2B. Here, the projection part has been described, but the electronic apparatus 100 may project an image in various manners. Here, the projection part 111 may include a projection lens 110 which is movable. Here, the projection surface may be a portion of a physical space on which the image is output or may be a separate screen.

In addition, the projection part 111 may include the projection lens 110 for outputting the image on the projection surface and a movement controller (not illustrated) for moving the projection lens 110. At least one of a projection distance or a projection direction of the projection lens 110 may be changed by the movement controller (not illustrated). The projection lens 110 may be a component included in the projection part 111. Here, the projection lens 110 may be moved under the control of the processor 114. If the projection lens 110 is moved, an output position and an output size of the image may be changed.

The memory 112 may store a first image and a second image output to the projection surface. Here, the memory 112 may store an image. Specifically, the memory 112 may store at least one image, which is a target to be output through the projection part 111. Here, the image may be the meaning including a moving image in addition to a still image. In addition, a content may be described instead of the image. A detailed description related to the memory 112 will be described with reference to FIG. 2B.

The sensor part 113 may include at least one sensor. The sensor part 113 may include at least one of various types of sensors. Here, the sensor part 113 may include at least one of a distance sensor sensing a distance, a three-dimensional space recognition sensor analyzing a space, or an image sensor. Here, the distance sensor may refer to a sensor acquiring sensing data for measuring a distance. Here, the three-dimensional space recognition sensor may refer to a sensor acquiring sensing data for recognizing a three-dimensional space. Here, the sensor part 113 may include at least one of an infrared sensor, an ultrasonic sensor, a laser sensor, a light detection and ranging (LiDAR) sensor, or an image sensor. Here, the image sensor may include at least one of a camera or a depth camera. Here, an inclination sensor may include at least one of an acceleration sensor or a gyro sensor.

The processor 114 may perform a general control operation of the electronic apparatus 100. Specifically, the processor 114 serves to control a general operation of the electronic apparatus 100.

The processor 114 may include the projection part 111. Here, the projection part 111 may output an image to the projection surface.

The processor 114 may acquire distance information from the electronic apparatus 100 to the projection surface through the sensor part 113 (or acquire distance information of the electronic apparatus 100 relative to the projection surface through the sensor part 113), may acquire output size information of an image based on the distance information acquired through the sensor part 113 (for projecting the image onto the projection surface), may acquire projection surface information corresponding to a bend of the projection surface through the sensor part 113, may acquire movement information of the projection lens 110 which is movable based on the output size information of the image and the projection surface information (for projecting the image onto a single plane of the projection surface), and may control the projection part 111 to output an image based on the movement information.

Here, the processor 114 may acquire sensing data for distance measurement through the sensor part 113. In addition, the processor 114 may acquire distance information between the projection surface and the electronic apparatus 100 based on the acquired sensing data.

Here, the processor 114 may acquire output size information of the image based on the distance information to the projection surface. Here, the output size information of the image may refer to an actual size of the image output on the projection surface. Accordingly, even though images having the same resolution are output, the output size information of the image may be different according to the distance information. This will be described in detail with reference to FIG. 7.

Here, the processor 114 may acquire projection surface information based on the sensing data acquired through the sensor part 113. Here, the projection surface may refer to a space in which the image is to be output, and may refer to a wall, a screen, or the like.

Here, the projection surface information may include at least one of a size of the projection surface, a position of the projection surface, a material of the projection surface, a form of the projection surface, whether or not a bend is included in the projection surface, a position of the bend included in the projection surface, a length of the bend included in the projection surface, or the number of bends included in the projection surface.

According to an embodiment, the sensing data used to acquire distance information and the sensing data used to acquire projection surface information may be acquired through the same sensor. For example, both the distance information and the projection surface information may be acquired through a first sensor. Here, the first sensor may be a LiDAR sensor.

According to another embodiment, the sensing data used to acquire distance information and the sensing data used to acquire projection surface information may be acquired through different sensors. For example, the distance information may be acquired through a first sensor, and the projection surface information may be acquired through a second sensor. Here, the first sensor may be an infrared sensor, and the second sensor may be a LiDAR sensor.

Here, the processor 114 may identify the bend included in the projection surface based on the sensing data. The bend may refer to a boundary line, a boundary area, an edge, etc. for dividing a wall (a first projection surface) and a wall (a second projection surface). Here, the processor 114 may identify at least one of a position of the bend, a length of the bend, or the total number of bends.

Here, the processor 114 may determine movement information of the projection lens 110 which is movable based on the output size information of the image and bend information of the projection surface. Specifically, the processor 114 may divide the projection surface into a plurality of areas based on the bend information of the projection surface. Here, the plurality of areas may include at least one of a wall surface, a floor surface, or a ceiling surface recognized around the electronic apparatus 100.

Here, the processor 114 may determine one of the plurality of areas as an output area, and may move the projection lens 110 to output an image only to the determined one area. For example, when an image is displayed over the plurality of areas as in an embodiment of FIG. 16 or an embodiment of FIG. 25, the image may be distorted.

Accordingly, the processor 114 may move the projection lens 110 so that an image may be output to one area.

The processor 114 may move the projection lens 110 to output the image to only one of the plurality of areas. For example, the processor 114 may move the projection lens 110 to change an output direction of the image as in an embodiment of FIG. 24 or an embodiment of FIG. 26.

Here, the processor 114 may acquire size information of the output area.

Here, the processor 114 may identify whether or not the image may be output to the determined output area as it is without changing a size of the image. The processor 114 may compare an output size of the image with a size of the output area.

If the output size of the image is equal to or greater than the size of the output area, the processor 114 needs to reduce the image so that the image may be output to only one area. Accordingly, the processor 114 may perform a downscaling operation to reduce the image.

According to an embodiment, if the output size of the image is less than the size of the output area, the processor 114 may directly output the image to the output area.

According to another embodiment, if the output size of the image is less than the size of the output area, the processor 114 may correct the output size of the image to a maximum size and then output the image of which the output size is corrected. Specifically, the processor 114 may perform an upscaling operation for enlarging the size of the image based on the size of the output area. An operation of changing the size of the image will be described with reference to FIG. 18.

Here, the processor 114 may move the projection lens 110 based on the movement information, and compare the size of the output area with the output size of the image to correct the size of the image. Then, the processor 114 may output the corrected image to the output area.

Meanwhile, the movement information may include at least one of a movement direction or a movement distance, and the processor 114 may control the projection part 111 to move the projection lens 110 based on the movement direction and the movement distance.

Here, the processor 114 may move the projection lens 110 in directions such as upward, downward, leftward, and rightward directions with respect to a fixed shaft of the projection lens 110. In addition the processor 114 may move the projection lens 110 by a calculated movement distance.

Meanwhile, the processor 114 may identify a bend position of the projection surface, divide the projection surface into a first area and a second area based on the bend position, identify one of the first area or the second area as an output area, and control the projection part 111 to output an image to the identified output area.

Here, the bend position ay be a position of the bend included in the projection surface. Here, the bend position may be described as a boundary line, a boundary area, a boundary position, an edge, etc.

Here, the processor 114 may analyze the projection surface to identify a position where the bend exists. In addition, the processor 114 may divide the projection surface into a plurality of areas based on the identified bend position. In addition, the processor 114 may determine one of the plurality of areas as the output area. In addition, the processor 114 may move the projection lens 110 or correct the size of the image to output the image to the determined output area.

Meanwhile, the processor 114 may acquire a size of the first area and a size of the second area, and may identify an area having a greater size, of the first area and the second area as the output area.

Here, the processor 114 may compare sizes of each of the plurality of areas with each other and output an image only to an area having the greatest size. This will be described in detail with reference to FIGS. 11 to 14.

Meanwhile, the processor 114 may identify the first area as the output area based on a size of a first portion of the image output to the first area among the areas to which the image is output being greater than a size of a second portion of the image output to the second area among the areas to which the image is output.

Here, the processor 114 may compare sizes of the image output to the plurality of areas with each other and output the entire image only to an area in which the image is displayed in a great size. This will be described with reference to FIGS. 15 and 16.

Meanwhile, the processor 114 may acquire a size of the output area, change a size of the image based on the size of the output area, and control the projection part 111 to output the changed image to the output area.

Here, there may be a case where the processor 114 should change the size of the image. This is because the output size of the image may be greater than the size of the output area. In this case, the processor 114 may downscale the image. In addition, there may be a need to enlarge the image as greatly as possible in the output area and provide the enlarged image to a user. In this case, the processor 114 may upscale the image. This will be described in detail with reference to FIG. 18.

Meanwhile, the processor 114 may change the size of the image while maintaining an aspect ratio of the image.

Here, the processor 114 may maintain the aspect ratio of the image in changing the size of the image. For example, if an aspect ratio of an original image is 16:9, the aspect ratio of 16:9 may be maintained in a process of changing the size of the image.

According to another implementation, the processor 114 may change the size of the image without maintaining the aspect ratio.

Meanwhile, the processor 114 may acquire a size of the output area, enlarge the size of the image based on the size of the output area being greater than the output size of the image, and reduce the size of the image based on the size of the output area being smaller than the output size of the image.

Here, the processor 114 may not change the size of the image if the size of the output area coincides with the output size of the image. Here, the processor 114 may consider the size of the output area in changing the size of the image.

Meanwhile, the processor 114 may acquire movement information based on a movement limit value corresponding to the projection lens 110, and control the projection part 111 to output a user interface (UI) for guiding a position of the electronic apparatus 100 based on a movement distance included in the movement information being greater than the movement limit value.

Here, the movement limit value may refer to a maximum movable distance of the projection lens 110. The movement limit value may be described as a maximum movement distance. Because the processor 114 may not move the projection lens 110 beyond the movement limit value, a situation in which an optimal screen may not be provided only by the movement of the projection lens 110 may occur. Here, the processor 114 may output a UI including a command to move the electronic apparatus 100 to provide an optimal screen. This will be described in detail with reference to FIGS. 27 and 28.

Meanwhile, the processor 114 may identify whether or not the image is output to both the first area and the second area based on a captured image acquired through the image sensor based on the projection surface including the first area and the second area, and acquire the movement information of the projection lens 110 when the image is output to both the first area and the second area.

Here, the processor 114 may analyze the projection surface to divide the plurality of areas (the first area and the second area). Here, the processor 114 may identify whether or not the image is being output over the plurality of areas. If the image is not being output over the plurality of areas, the processor 114 may not move the projection lens 110.

If it is identified that the image is simultaneously output to the plurality of areas, the processor 114 may acquire movement information for moving the projection lens 110. A specific movement operation of the projection lens 110 will be described with reference to FIGS. 24 to 26.

According to an embodiment, the processor 114 may perform a size changing operation of the image after acquiring movement information of the projection lens 110.

According to another embodiment, the processor 114 may acquire the movement information of the projection lens 110 after first performing a size changing operation of the image.

According to still another embodiment, the processor 114 may synthesize the acquired information and simultaneously perform a movement information acquiring operation of the projection lens 110 and a size changing operation of the image.

The electronic apparatus 100 according to an embodiment of the disclosure may provide a screen currently most suitable for the projection surface to the user using the output size of the image and the projection surface information. Specifically, the electronic apparatus 100 may correct the size of the image to correspond to the output area while moving the projection lens 110. Here, the electronic apparatus 100 may provide a screen suitable for a wider space by moving the projection lens 110, and generate a suitable screen by changing the size of the image to enlarge or reduce the size of the image. Accordingly, the processor 114 may generate and provide a suitable screen to the user in spite of the distorted projection surface (or the projection surface including the bend).

Figure 2B:
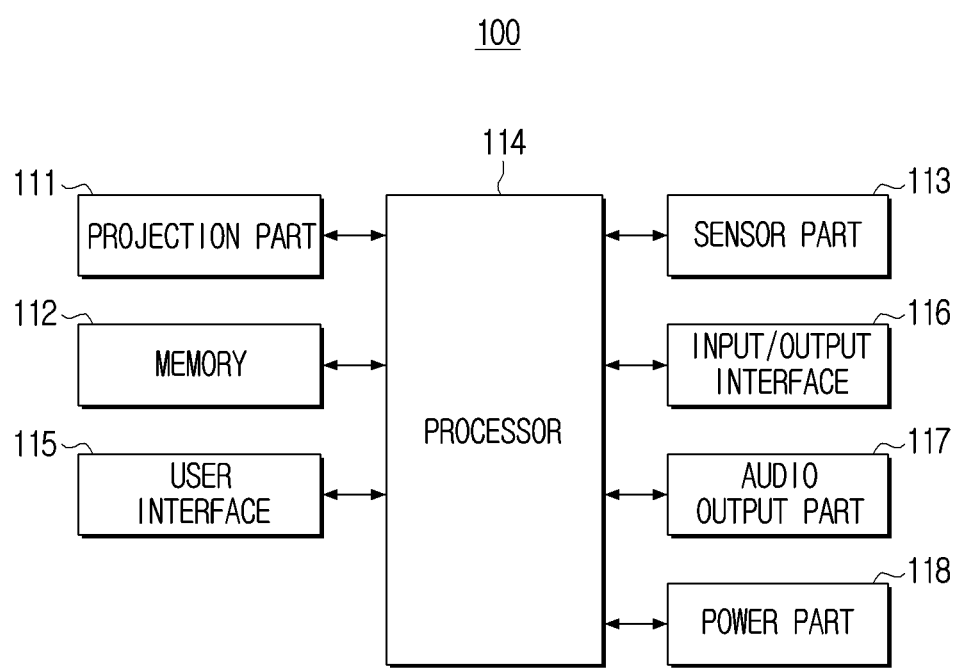
FIG. 2B is a block diagram for describing detailed components of FIG. 2A.

FIG. 2B is a block diagram for describing detailed components of FIG. 2A.

Referring to FIG. 2B, the electronic apparatus 100 may include the projection part 111, the memory 112, the sensor part 113, the processor 114, a user interface 115, an input/output interface 116, and an audio output part 117 and a power part 118, Here, some descriptions of the projection part 111, the memory 112, the sensor part 113, and the processor 114 have been provided with reference to FIG. 2A, and are thus omitted. Meanwhile, components illustrated in FIG. 2B are only an example, and some components may be omitted and new components may be added.

The projection part 111 is a component that projects an image to the outside. The projection part 111 according to an embodiment of the disclosure may be implemented in various projection methods (e.g., a cathode-ray tube (CRT) method, a liquid crystal display (LCD) method, a digital light processing (DLP) method, a laser method, etc.). As an example, the CRT method has basically the same principle as the principle of a CRT monitor. In the CRT method, an image is enlarged with a lens in front of a cathode-ray tube (CRT), and the image is displayed on a screen. According to the number of cathode-ray tubes, the CRT method is divided into a one-tube method and a three-tube method, and in the case of the three-tube method, it may be implemented while cathode-ray tubes of red, green, and blue are divided separately.

As another example, the LCD method is a method of displaying an image by making a light emitted from a light source pass through a liquid crystal. The LCD method is divided into a single-plate method and a three-plate method, and in the case of the three-plate method, a light emitted from a light source may be separated into red, green, and blue at a dichroic mirror (a mirror that reflects only a light in a specific color and makes the remaining lights pass through), and then pass through a liquid crystal, and then the light may be collected into one place again.

As still another example, the DLP method is a method of displaying an image by using a digital micromirror device (DMD) chip. A projection part by the DLP method may include a light source, a color wheel, a DMD chip, a projection lens, etc. A light emitted from a light source may have a color as it passes through a rotating color wheel. The light that passed through the color wheel is input into a DMD chip. The DMD chip includes numerous micromirrors, and reflects the light input into the DMD chip. A projection lens may perform a role of enlarging the light reflected from the DMD chip to an image size.

As still another example, the laser method includes a diode pumped solid state (DPSS) laser and a galvanometer. As a laser outputting various colors, a laser wherein three DPSS lasers were installed for each of RGB colors, and then the optical axes were overlapped by using a special mirror is used. The galvanometer includes a mirror and a motor of a high output, and moves the mirror at a fast speed. For example, the galvanometer may rotate the mirror at 40 KHz/sec at the maximum. The galvanometer is mounted according to a scanning direction, and in general, a projector performs planar scanning, and thus the galvanometer may also be arranged by being divided into x and y axes.

Meanwhile, the projection part 111 may include light sources in various types. For example, the projection part 111 may include at least one light source among a lamp, an LED, and a laser.

Also, the projection part 111 may output images in a 4:3 screen ratio, a 5:4 screen ratio, and a 16:9 wide screen ratio according to the use of the electronic apparatus 100 or a user's setting, etc., and it may output images in various resolutions such as WVGA(854*480), SVGA(800*600), XGA(1024*768), WXGA(1280*720), WXGA(1280*800), SXGA(1280*1024), UXGA(1600*1200), Full HD(1920*1080), etc. according to screen ratios.

Meanwhile, the projection part 111 may perform various functions for adjusting an output image by control of the processor 114. For example, the projection part 111 may perform functions such as zoom, keystone, quick corner (4 corner) keystone, lens shift, etc.

Specifically, the projection part 111 may enlarge or reduce an image according to a distance (a projection distance) to the screen. That is, a zoom function may be performed according to a distance to the screen. Here, the zoom function may include a hardware method of adjusting the size of the screen by moving a lens and a software method of adjusting the size of the screen by cropping an image, etc. Meanwhile, when the zoom function is performed, adjustment of a focus of an image is needed. For example, methods of adjusting a focus include a manual focus method, an electric method, etc. The manual focus method means a method of manually adjusting a focus, and the electric method means a method wherein the projector automatically adjusts a focus by using a built-in motor when the zoom function is performed. When performing the zoom function, the projection part 111 may provide a digital zoom function through software, and it may also provide an optical zoom function of performing the zoom function by moving a lens through the driving part.

Also, the projection part 111 may perform a keystone function. When the height does not fit in the case of front surface scanning, the screen may be distorted in an upper direction or a lower direction. The keystone function means a function of correcting a distorted screen. For example, if distortion occurs in left and right directions of the screen, the screen may be corrected by using a horizontal keystone, and if distortion occurs in upper and lower directions, the screen may be corrected by using a vertical keystone. The quick corner (4 corner) keystone function is a function of correcting the screen in case the central area of the screen is normal, but the balance of the corner areas is not appropriate. The lens shift function is a function of moving the screen as it is in case the screen is outside the screen area.

Meanwhile, the projection part 111 may automatically analyze the surrounding environment and the projection environment without a user input, and perform zoom/keystone/focus functions. Specifically, the projection part 111 may automatically provide zoom/keystone/focus functions based on the distance between the electronic apparatus 100 and the screen, information on the space wherein the electronic apparatus 100 is currently located, information on the light amount in the surroundings, etc. that were sensed through sensors (a depth camera, a distance sensor, an infrared sensor, an illumination sensor, etc.).

Also, the projection part 111 may provide an illumination function by using a light source. In particular, the projection part 111 may provide an illumination function by outputting a light source by using an LED. According to an embodiment of the disclosure, the projection part 111 may include an LED, and according to another embodiment of the disclosure, the electronic apparatus may include a plurality of LEDs. Meanwhile, the projection part 111 may output a light source by using a surface-emitting LED depending on implementation examples. Here, the surface-emitting LED may mean an LED that has a structure wherein an optical sheet is arranged on the upper side of the LED such that a light source is output while being evenly dispersed. Specifically, when a light source is output through the LED, the light source may be evenly dispersed through the optical sheet, and the light source dispersed through the optical sheet may be introduced into a display panel.

Meanwhile, the projection part 111 may provide a dimming function for adjusting the strength of a light source to a user. Specifically, if a user input for adjusting the strength of a light source is received from a user through a user interface 115 (e.g., a touch display button or a dial), the projection part 111 may control the LED to output the strength of a light source corresponding to the received user input.

Also, the projection part 111 may provide the dimming function based on a content analyzed by the processor 114 without a user input. Specifically, the projection part 111 may control the LED to output the strength of a light source based on information on a content that is currently provided (e.g., the type of the content, the brightness of the content, etc.).

Meanwhile, the projection part 111 may control a color temperature by control of the processor 114. Here, the processor 114 may control a color temperature based on a content. Specifically, if it is identified that a content is going to be output, the processor 114 may acquire color information for each frame of the content which was determined to be output. Then, the processor 114 may control the color temperature based on the acquired color information for each frame. Here, the processor 114 may acquire at least one main color of the frames based on the color information for each frame. Then, the processor 114 may adjust the color temperature based on the acquired at least one main color. For example, a color temperature that the processor 114 can adjust may be divided into a warm type or a cold type. Here, it is assumed that a frame to be output (referred to as an output frame hereinafter) includes a scene wherein fire occurred. The processor 114 may identify (or acquire) that the main color is red based on color information currently included in the output frame. Then, the processor 114 may identify a color temperature corresponding to the identified main color (red). Here, the color temperature corresponding to red may be a warm type. Meanwhile, the processor 114 may use an artificial intelligence model for acquiring color information or a main color of a frame. According to an embodiment of the disclosure, the artificial intelligence model may be stored in the electronic apparatus 100 (e.g., the memory 112). According to another embodiment of the disclosure, the artificial intelligence model may be stored in an external server that can communicate with the electronic apparatus 100.

Meanwhile, the electronic apparatus 100 may be interlocked with an external device and control the illumination function. Specifically, the electronic apparatus 100 may receive illumination information from an external device. Here, the illumination information may include at least one of brightness information or color temperature information set in the external device. Here, the external device may mean a device connected to the same network as the electronic apparatus 100 (e.g., an IoT device included in the same home/company network) or a device which is not connected to the same network as the electronic apparatus 100, but which can communicate with the electronic apparatus (e.g., a remote control server). For example, it is assumed that an external illumination device included in the same network as the electronic apparatus 100 (an IoT device) is outputting a red illumination at the brightness of 50. The external illumination device (an IoT device) may directly or indirectly transmit illumination information (e.g., information indicating that a red illumination is being output at the brightness of 50) to the electronic apparatus. Here, the electronic apparatus 100 may control the output of a light source based on the illumination information received from the external illumination device. For example, if the illumination information received from the external illumination device includes information that a red illumination is being output at the brightness of 50, the electronic apparatus 100 may output the red illumination at the brightness of 50.

Meanwhile, the electronic apparatus 100 may control the illumination function based on bio-information. Specifically, the processor 114 may acquire bio-information of a user. Here, the bio-information may include at least one of the body temperature, the heart rate, the blood pressure, the breath, or the electrocardiogram of the user. Here, the bio-information may include various information other than the aforementioned information. As an example, the electronic apparatus may include a sensor for measuring bio-information. The processor 114 may acquire bio-information of a user through the sensor, and control the output of a light source based on the acquired bio-information. As another example, the processor 114 may receive bio-information from an external device through the input/output interface 116. Here, the external device may mean a portable communication device of a user (e.g., a smartphone or a wearable device). The processor 114 may acquire bio-information of a user from the external device, and control the output of a light source based on the acquired bio-information. Meanwhile, depending on implementation examples, the electronic apparatus may identify whether a user is sleeping, and if it is identified that a user is sleeping (or preparing to sleep), the processor 114 may control the output of a light source based on the bio-information of the user.

The memory 112 may store at least one instruction regarding the electronic apparatus 100. Also, in the memory 112, an operating system (O/S) for driving the electronic apparatus 100 may be stored. In addition, in the memory 112, various software programs or applications for the electronic apparatus 100 to operate according to the various embodiments of the disclosure may be stored. Further, the memory 112 may include a semiconductor memory such as a flash memory or a magnetic storage medium such as a hard disk.

Specifically, in the memory 112, various kinds of software modules for the electronic apparatus 100 to operate according to the various embodiments of the disclosure may be stored, and the processor 114 may control the operations of the electronic apparatus 100 by executing the various kinds of software modules stored in the memory 112. That is, the memory 112 may be accessed by the processor 114, and reading/recording/correcting/deleting/updating, etc. of data by the processor 114 may be performed.

Meanwhile, in the disclosure, the term memory 112 may be used as meaning including the memory 112, a ROM (not shown) and a RAM (not shown) inside the processor 114, or a memory card (not shown) installed on the electronic apparatus 100 (e.g., a micro SD card, a memory stick).

The user interface 115 may include input devices in various types. For example, the user interface 115 may include a physical button. Here, the physical button may include a function key, direction keys (e.g., four direction keys), or a dial button. According to an embodiment of the disclosure, the physical button may be implemented as a plurality of keys. According to another embodiment of the disclosure, the physical button may be implemented as one key. Here, in case the physical button is implemented as one key, the electronic apparatus 100 may receive a user input by which one key is pushed for equal to or longer than a threshold time. If a user input by which one key is pushed for equal to or longer than a threshold time is received, the processor 114 may perform a function corresponding to the user input. For example, the processor 114 may provide the illumination function based on the user input.

Also, the user interface 115 may receive a user input by using a non-contact method. In the case of receiving a user input through a contact method, physical force should be transmitted to the electronic apparatus. Accordingly, a method for controlling the electronic apparatus regardless of physical force may be needed. Specifically, the user interface 115 may receive a user gesture, and perform an operation corresponding to the received user gesture. Here, the user interface 115 may receive a gesture of a user through a sensor (e.g., an image sensor or an infrared sensor).

In addition, the user interface 115 may receive a user input by using a touch method. For example, the user interface 115 may receive a user input through a touch sensor. According to an embodiment of the disclosure, a touch method may be implemented as a non-contact method. For example, the touch sensor may determine whether a user's body approached within a threshold distance. Here, the touch sensor may identify a user input even when a user does not contact the touch sensor. Meanwhile, according to a different implementation example, the touch sensor may identify a user input by which a user contacts the touch sensor.

Meanwhile, the electronic apparatus 100 may receive user inputs by various methods other than the aforementioned user interface. As an example, the electronic apparatus 100 may receive a user input through an external remote control device. Here, the external remote control device may be a remote control device corresponding to the electronic apparatus 100 (e.g., a control device dedicated to the electronic apparatus) or a portable communication device of a user (e.g., a smartphone or a wearable device). Here, in the portable communication device of a user, an application for controlling the electronic apparatus may be stored. The portable communication device may acquire a user input through the stored application, and transmit the acquired user input to the electronic apparatus 100. The electronic apparatus 100 may receive the user input from the portable communication device, and perform an operation corresponding to the user's control command.

Meanwhile, the electronic apparatus 100 may receive a user input by using voice recognition. According to an embodiment of the disclosure, the electronic apparatus 100 may receive a user voice through the microphone included in the electronic apparatus. According to another embodiment of the disclosure, the electronic apparatus 100 may receive a user voice from the microphone or an external device. Specifically, an external device may acquire a user voice through a microphone of the external device, and transmit the acquired user voice to the electronic apparatus 100. The user voice transmitted from the external device may be audio data or digital data converted from audio data (e.g., audio data converted to a frequency domain, etc.). Here, the electronic apparatus 100 may perform an operation corresponding to the received user voice. Specifically, the electronic apparatus 100 may receive audio data corresponding to the user voice through the microphone. Then, the electronic apparatus 100 may convert the received audio data into digital data. Then, the electronic apparatus 100 may convert the converted digital data into text data by using a speech to text (STT) function. According to an embodiment of the disclosure, the speech to text (STT) function may be directly performed at the electronic apparatus 100.

According to another embodiment of the disclosure, the speech to text (STT) function may be performed at an external server. The electronic apparatus 100 may transmit digital data to the external server. The external server may convert the digital data into text data, and acquire control command data based on the converted text data. The external server may transmit the control command data (here, the text data may also be included) to the electronic apparatus 100. The electronic apparatus 100 may perform an operation corresponding to the user voice based on the acquired control command data.

Meanwhile, the electronic apparatus 100 may provide a voice recognition function by using one assistance (or an artificial intelligence agent, e.g., Bixby™, etc.), but this is merely an example, and the electronic apparatus 100 may provide a voice recognition function through a plurality of assistances. Here, the electronic apparatus 100 may provide the voice recognition function by selecting one of the plurality of assistances based on a trigger word corresponding to the assistance or a specific key that exists on the remote control.

Meanwhile, the electronic apparatus 100 may receive a user input by using a screen interaction. The screen interaction may mean a function of the electronic apparatus of identifying whether a predetermined event occurs through an image projected on a screen (or a projection surface), and acquiring a user input based on the predetermined event. Here, the predetermined event may mean an event wherein a predetermined object is identified in a specific location (e.g., a location wherein a UI for receiving a user input was projected). Here, the predetermined object may include at least one of a body part of a user (e.g., a finger), a pointer, or a laser point. If the predetermined object is identified in a location corresponding to the projected UI, the electronic apparatus 100 may identify that a user input selecting the projected UI was received. For example, the electronic apparatus 100 may project a guide image so that the UI is displayed on the screen. Then, the electronic apparatus 100 may identify whether the user selects the projected UI. Specifically, if the predetermined event is identified in the location of the projected UI, the electronic apparatus 100 may identify that the user selected the projected UI. Here, the projected UI may include at least one item. Here, the electronic apparatus 100 may perform spatial analysis for identifying whether the predetermined event is in the location of the projected UI. Here, the electronic apparatus 100 may perform spatial analysis through a sensor (e.g., an image sensor, an infrared sensor, a depth camera, a distance sensor, etc.). By performing spatial analysis, the electronic apparatus 100 may identify whether the predetermined event occurs in the specific location (the location wherein the UI was projected). Then, if it is identified that the predetermined event occurs in the specific location (the location wherein the UI was projected), the electronic apparatus 100 may identify that a user input for selecting the UI corresponding to the specific location was received.

The input/output interface 116 is a component for inputting or outputting at least one of an audio signal or an image signal. The input/output interface 116 may receive input of at least one of an audio signal or an image signal from an external device, and output a control command to the external device.

Meanwhile, the input/output interface 116 according to an embodiment of the disclosure may be implemented as a wired input/output interface of at least one of a high definition multimedia interface (HDMI), a mobile high-definition link (MHL), a universal serial bus (USB), a USB C-type, a display port (DP), a Thunderbolt, a video graphics array (VGA) port, an RGB port, a Dsubminiature (D-SUB), or a digital visual interface (DVI). According to an embodiment of the disclosure, the wired input/output interface may be implemented as an interface inputting or outputting only audio signals and an interface inputting or outputting only image signals, or implemented as one interface inputting or outputting both audio signals and image signals.

Also, the electronic apparatus 100 may receive data through the wired input/output interface, but this is merely an example, and the electronic apparatus 100 may be supplied with power through the wired input/output interface. For example, the electronic apparatus 100 may be supplied with power from an external battery through a USB C-type, or supplied with power from a consent through a power adapter. As another example, the electronic apparatus may be supplied with power from an external device (e.g., a laptop computer or a monitor, etc.) through a DP.

Meanwhile, the input/output interface 116 according to an embodiment of the disclosure may be implemented as a wireless input/output interface that performs communication by at least one communication method among the communication methods of Wi-Fi, Wi-Fi Direct, Bluetooth, Zigbee, 3rd Generation (3G), 3rd Generation Partnership Project (3GPP), and Long Term Evolution (LTE). Depending on implementation examples, the wireless input/output interface may be implemented as an interface inputting or outputting only audio signals and an interface inputting or outputting only image signals, or implemented as one interface inputting or outputting both audio signals and image signals.

Also, the electronic apparatus 100 may be implemented such that an audio signal is input through a wired input/output interface, and an image signal is input through a wireless input/output interface. Alternatively, the electronic apparatus 100 may be implemented such that an audio signal is input through a wireless input/output interface, and an image signal is input through a wired input/output interface.

The audio output part 117 is a component that outputs audio signals. In particular, the audio output part 117 may include an audio output mixer, an audio signal processor, and an audio output module. The audio output mixer may mix a plurality of audio signals to be output as at least one audio signal. For example, the audio output mixer may mix an analog audio signal and another analog audio signal (e.g.,: an analog audio signal received from the outside) as at least one analog audio signal. The audio output module may include a speaker or an output terminal. According to an embodiment of the disclosure, the audio output module may include a plurality of speakers, and in this case, the audio output module may be arranged inside the main body, and audio that is emitted while covering at least a part of a vibration plate of the audio output module may be transmitted to the outside of the main body after passing through a waveguide. The audio output module may include a plurality of audio output units, and the plurality of audio output units may be symmetrically arranged on the exterior of the main body, and accordingly, audio may be emitted to all directions, i.e., all directions in 360 degrees.

The power part 118 may be supplied with power from the outside and supply the power to various components of the electronic apparatus 100. The power part 118 according to an embodiment of the disclosure may be supplied with power through various methods. As an example, the power part 118 may be supplied with power by using the connector 130 as illustrated in FIG. 1. Also, the power part 118 may be supplied with power by using a DC power code of 220V. However, the disclosure is not limited thereto, and the electronic apparatus may be supplied with power by using a USB power code or supplied with power by using a wireless charging method.

Also, the power part 118 may be supplied with power by using an internal battery or an external battery. The power part 118 according to an embodiment of the disclosure may be supplied with power through an internal battery. As an example, the power part 118 may charge power of the internal battery by using at least one of a DC power code of 220V, a USB power code, or a USB C-type power code, and may be supplied with power through the charged internal battery. Also, the power part 118 according to an embodiment of the disclosure may be supplied with power through an external battery. As an example, if connection between the electronic apparatus and an external battery is performed through various wired communication methods such as a USB power code, a USB C-type power code, a socket groove, etc., the power part 118 may be supplied with power through the external battery. That is, the power part 118 may be directly supplied with power from an external battery, or charge an internal battery through an external battery, and supplied with power from the charged internal battery.

The power part 118 according to the disclosure may be supplied with power by using at least one of the aforementioned plurality of power supplying methods.

Meanwhile, regarding power consumption, the electronic apparatus 100 may have power consumption of equal to or smaller than a predetermined value (e.g., 43 W) for the reason of a form of a socket or other standards, etc. Here, the electronic apparatus 100 may vary the power consumption such that the power consumption can be reduced when using a battery. That is, the electronic apparatus 100 may vary the power consumption based on the power supplying method and the use amount of power, etc.

Meanwhile, the electronic apparatus 100 according to an embodiment of the disclosure may provide various smart functions.

Specifically, the electronic apparatus 100 may be connected with a portable terminal device for controlling the electronic apparatus 100, and the screen output at the electronic apparatus 100 may be controlled through a user input that is input at the portable terminal device. As an example, the portable terminal device may be implemented as a smartphone including a touch display, and the electronic apparatus 100 may receive screen data provided at the portable terminal device from the portable terminal device and output the data, and the screen output at the electronic apparatus 100 may be controlled according to a user input that is input at the portable terminal device.

The electronic apparatus 100 may perform connection with the portable terminal device through various communication methods such as Miracast, Airplay, wireless DEX, a remote PC method, etc., and share contents or music provided at the portable terminal device.

Also, connection between the portable terminal device and the electronic apparatus 100 may be performed by various connection methods. As an example, the electronic apparatus 100 may be searched at the portable terminal device and wireless connection may be performed, or the portable terminal device may be searched at the electronic apparatus 100 and wireless connection may be performed. Then, the electronic apparatus 100 may output contents provided at the portable terminal device.

As an example, in a state wherein a specific content or music is being output at the portable terminal device, if the portable terminal device is located around the electronic apparatus, and then a predetermined gesture (e.g., a motion tap view) is detected through a display of the portable terminal device, the electronic apparatus 100 may output the content or music that is being output at the portable terminal device.

As an example, in a state wherein a specific content or music is being output at the portable terminal device, if the portable terminal device becomes close to the electronic apparatus 100 by equal to or smaller than a predetermined distance (e.g., a non-contact tap view), or the portable terminal device contacts the electronic apparatus 100 two times at a short interval (e.g., a contact tap view), the electronic apparatus 100 may output the content or music that is being output at the portable terminal device.

In the aforementioned embodiment, it was described that the same screen as the screen that is being provided at the portable terminal device is provided at the electronic apparatus 100, but the disclosure is not limited thereto. That is, if connection between the portable terminal device and the electronic apparatus 100 is constructed, a first screen provided at the portable terminal device may be output at the portable terminal device, and a second screen provided at the portable terminal device that is different from the first screen may be output at the electronic apparatus 100. As an example, the first screen may be a screen provided by a first application installed on the portable terminal device, and the second screen may be a screen provided by a second application installed on the portable terminal device. As an example, the first screen and the second screen may be different screens from each other that are provided by one application installed on the portable terminal device. Also, as an example, the first screen may be a screen including a UI in a remote control form for controlling the second screen.

The electronic apparatus 100 according to the disclosure may output a standby screen. As an example, in case connection between the electronic apparatus 100 and an external device was not performed or in case there is no input received from an external device during a predetermined time, the electronic apparatus 100 may output a standby screen. Conditions for the electronic apparatus 100 to output a standby screen are not limited to the aforementioned example, and a standby screen may be output by various conditions.

The electronic apparatus 100 may output a standby screen in the form of a blue screen, but the disclosure is not limited thereto. As an example, the electronic apparatus 100 may extract only a shape of a specific object from data received from an external device and acquire an atypical object, and output a standby screen including the acquired atypical object.

Figure 3:
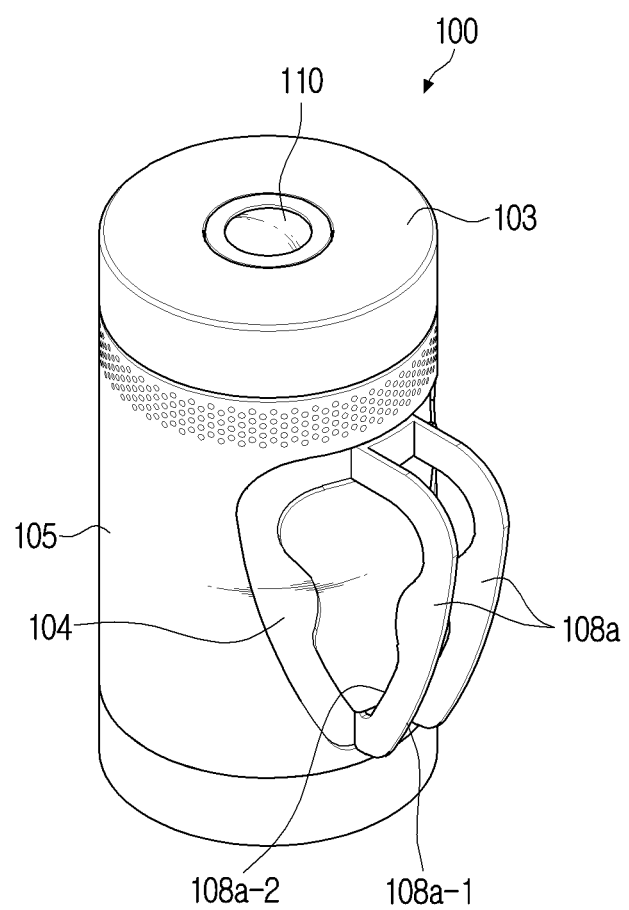
FIG. 3 is a perspective view illustrating an exterior of an electronic apparatus according to other embodiments of the disclosure.

FIG. 3 is a perspective view illustrating the exterior of the electronic apparatus 100 according to other embodiments of the disclosure.

Referring to FIG. 3, the electronic apparatus 100 may include a support (or, it may be referred to as "a handle") 108a.

The support 108a according to the various embodiments of the disclosure may be a handle or a ring that is provided for a user to grip or move the electronic apparatus 100. Alternatively, the support 108a may be a stand that supports the main body 105 while the main body 105 is laid down in the direction of the side surface.

The support 108a may be connected in a hinge structure such that it is coupled to or separated from the outer circumferential surface of the main body 105 as illustrated in FIG. 3, and it may be selectively separated from or fixed to the outer circumferential surface of the main body 105 according to a user's need. The number, shape, or arrangement structure of the support 108a may be implemented in various ways without restriction. Although not illustrated in the drawings, the support 108a may be housed inside the main body 105, and it may be taken out and used by a user depending on needs. Alternatively, the support 108a may be implemented as a separate accessory, and it may be attached to or detached from the electronic apparatus 100.

The support 108a may include a first support surface 108a-1 and a second support surface 108a-2. The first support surface 108a-1 may be a surface that faces the outer direction of the main body 105 while the support 108a is separated from the outer circumferential surface of the main body 105, and the second support surface 108a-2 may be a surface that faces the inner direction of the main body 105 while the support 108a is separated from the outer circumferential surface of the main body 105.

The first support surface 108a-1 may proceed toward the upper part of the main body 105 from the lower part of the main body 105 and get far from the main body 105, and the first support surface 108a-1 may have a shape that is flat or uniformly curved. In case the electronic apparatus 100 is held such that the outer side surface of the main body 105 contacts the bottom surface, i.e., in case the electronic apparatus 100 is arranged such that the projection lens 110 is toward the front surface direction, the first support surface 108a-1 may support the main body 105. In an embodiment including two or more supports 108a, the emission angle of the head 103 and the projection lens 110 may be adjusted by adjusting the interval or the hinge opening angle of the two supports 108a.

The second support surface 108a-2 is a surface that contacts a user or an external holding structure when the support 108a is supported by the user or the external holding structure, and it may have a shape corresponding to the gripping structure of the user's hand or the external holding structure such that the electronic apparatus 100 does not slip in case the electronic apparatus 100 is supported or moved. The user may make the projection lens 110 face toward the front surface direction, and fix the head 103 and hold the support 108a, and move the electronic apparatus 100, and use the electronic apparatus 100 like a flashlight.

The support groove 104 is a groove structure that is provided on the main body 105 and wherein the support 108a can be accommodated when it is not used, and as illustrated in FIG. 3, the support groove 104 may be implemented as a groove structure corresponding to the shape of the support 108a on the outer circumferential surface of the main body 105. Through the support groove 104, the support 108a may be kept on the outer circumferential surface of the main body 105 when the support 108a is not used, and the outer circumferential surface of the main body 105 may be maintained to be slick.

Alternatively, in a situation wherein the support 108a is kept inside the main body 105 and the support 108a is needed, the electronic apparatus 100 may have a structure wherein the support 108a is taken out to the outside of the main body 105. In this case, the support groove 104 may be a structure that is led into the inside of the main body 105 so as to accommodate the support 108a, and the second support surface 108a-2 may include a door (not shown) that adheres to the outer circumferential surface of the main body 105 or opens or closes the separate support groove 104.

Although not illustrated in the drawings, the electronic apparatus 100 may include various kinds of accessories that are helpful in using or keeping the electronic apparatus 100. For example, the electronic apparatus 100 may include a protection case (not shown) such that the electronic apparatus 100 can be easily carried while being protected. Alternatively, the electronic apparatus 100 may include a tripod (not shown) that supports or fixes the main body 105, and a bracket (not shown) that can be coupled to an outer surface and fix the electronic apparatus 100.

Figure 4A:
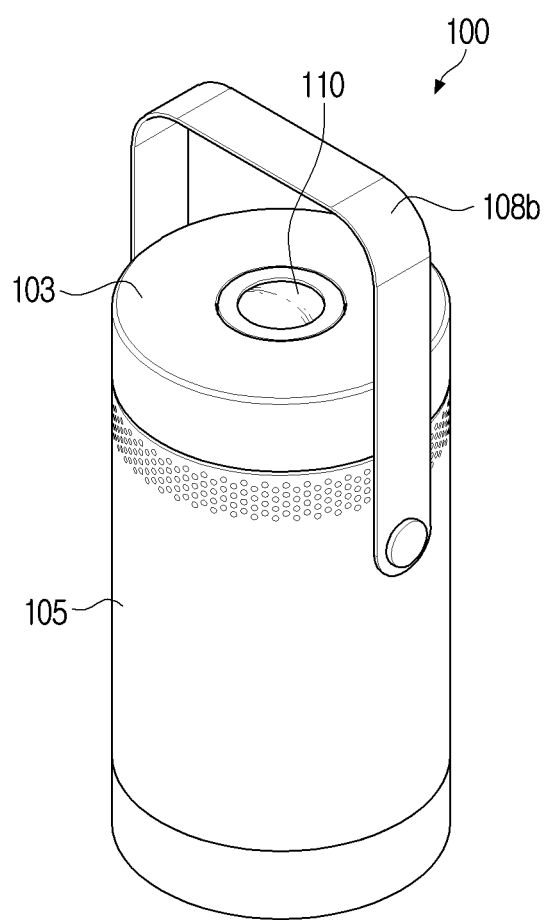
FIG. 4A is a perspective view illustrating an exterior of an electronic apparatus according to still other embodiments of the disclosure.

FIG. 4A is a perspective view illustrating the exterior of the electronic apparatus 100 according to still other embodiments of the disclosure.

Referring to FIG. 4A, the electronic apparatus 100 may include a support (or, it may be referred to as "a handle") 108b.

The support 108b according to the various embodiments of the disclosure may be a handle or a ring that is provided for a user to grip or move the electronic apparatus 100. Alternatively, the support 108b may be a stand that supports the main body 105 so that the main body 105 can be toward a random angle while the main body 105 is laid down in the direction of the side surface.

Specifically, as illustrated in FIG. 4A, the support 108b may be connected with the main body 105 at a predetermined point (e.g., a ⅔-¾ point of the height of the main body) of the main body 105. When the support 108b is rotated in the direction of the main body, the main body 105 may be supported such that the main body 105 can be toward a random angle while the main body 105 is laid down in the direction of the side surface.

Figure 4B:
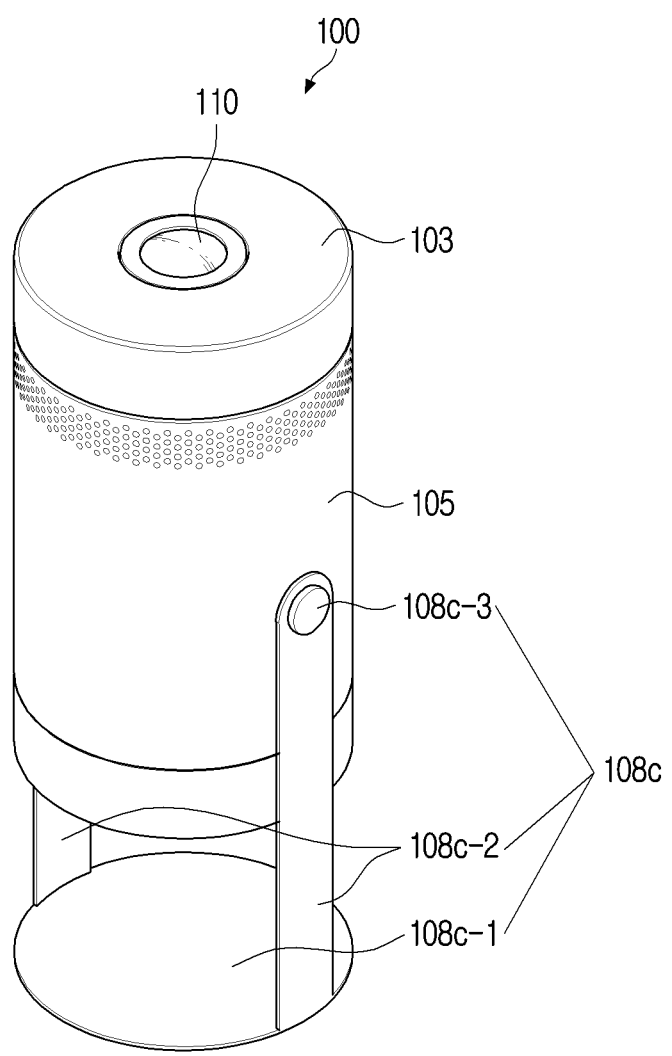
FIG. 4B is a perspective view illustrating an exterior of an electronic apparatus according to still other embodiments of the disclosure.

FIG. 4B is a perspective view illustrating the exterior of the electronic apparatus 100 according to still other embodiments of the disclosure.

Referring to FIG. 4B, the electronic apparatus 100 may include a support (or, it may be referred to as "a prop") 108c. The support 108c according to the various embodiments of the disclosure may include a base plate 108c-1 that is provided to support the electronic apparatus 100 on the ground and two support members 108c-2 connecting the base plate 108c-1 and the main body 105.

According to an embodiment of the disclosure, the heights of the two support members 108c-2 are identical, and thus each one cross section of the two support members 108c-2 may be coupled or separated by a groove and a hinge member 108c-3 provided on one outer circumferential surface of the main body 105.

The two support members may be hinge-coupled to the main body 105 at a predetermined point (e.g., a ⅓-¾ point of the height of the main body) of the main body 105.

When the two support members and the main body are coupled by the hinge member 108c-3, the main body 105 is rotated based on a virtual horizontal axis formed by the two hinge members 108c-3, and accordingly, the emission angle of the projection lens 110 may be adjusted.

Figure 4C:
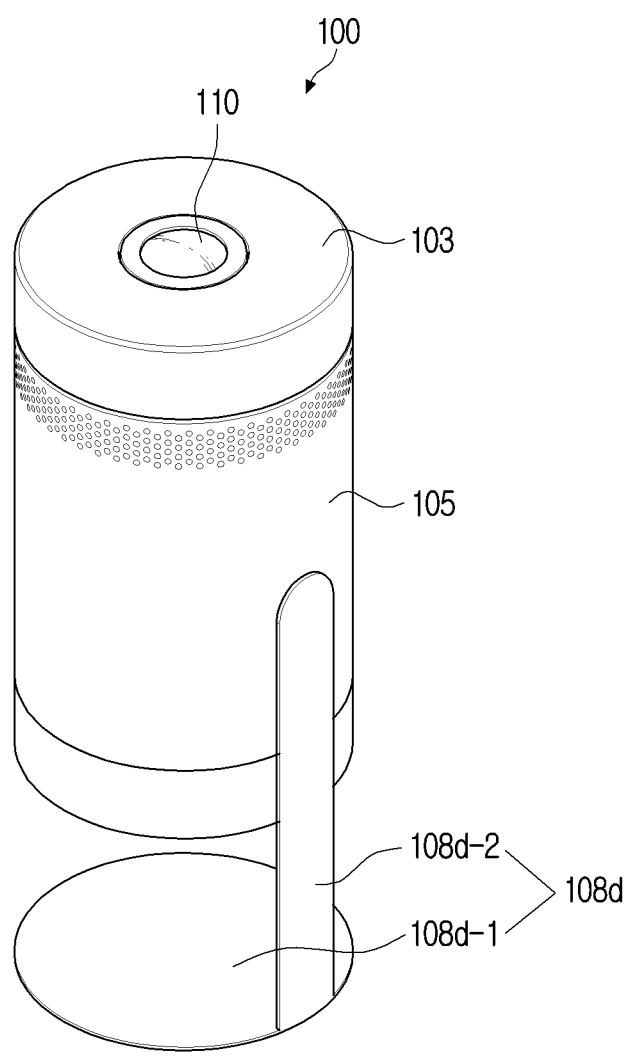
FIG. 4C is a perspective view illustrating an exterior of an electronic apparatus according to still other embodiments of the disclosure.
Figure 4D:
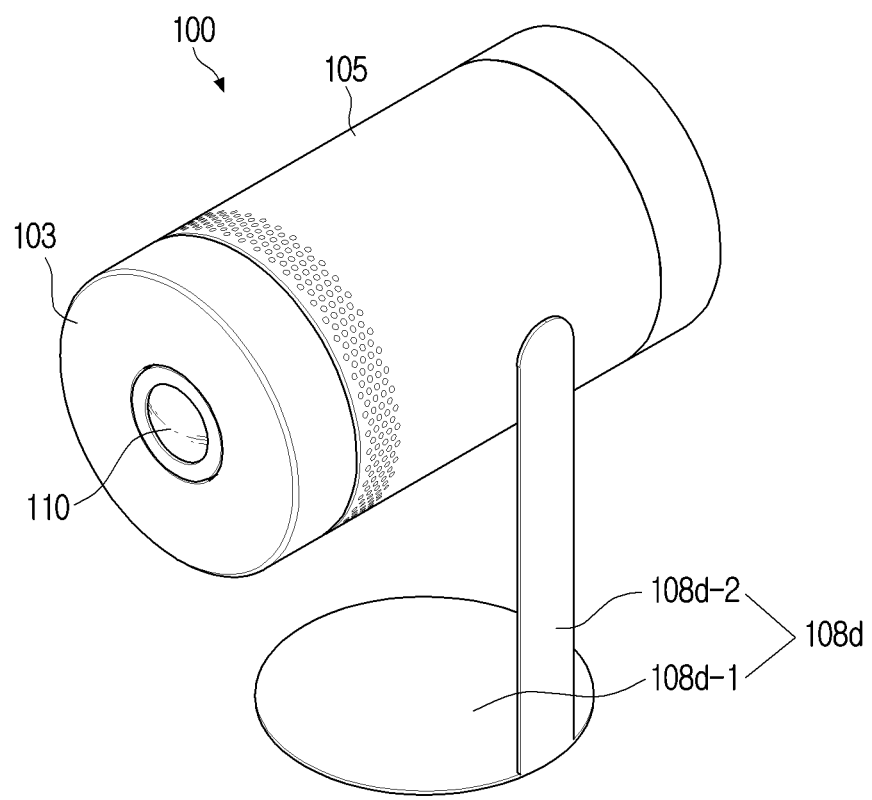
FIG. 4D is a perspective view illustrating a state in which the electronic apparatus of FIG. 4C is rotated.

FIG. 4B illustrates an embodiment wherein the two support members 108c-2 are connected with the main body 105, but the disclosure is not limited thereto, and as in FIG. 4C and FIG. 4D, one support member and the main body 105 may be connected by one hinge member.

FIG. 4C is a perspective view illustrating the exterior of the electronic apparatus 100 according to still other embodiments of the disclosure.

FIG. 4D is a perspective view illustrating a state wherein the electronic apparatus 100 in FIG. 4C is rotated.

Referring to FIG. 4C and FIG. 4D, the support 108d according to the various embodiments of the disclosure may include a base plate 108d-1 that is provided to support the electronic apparatus 100 on the ground and one support member 108d-2 connecting the base plate 108d-1 and the main body 105.

Also, the cross section of the one support member 108d-2 may be coupled or separated by a groove and a hinge member (not shown) provided on one outer circumferential surface of the main body 105.

When the one support member 108d-2 and the main body 105 are coupled by one hinge member (not shown), the main body 105 may be rotated based on a virtual horizontal axis formed by the one hinger member (not shown), as in FIG. 4D.

Meanwhile, the supports illustrated in FIGS. 3, 4A, 4B, 4C, and 4D are merely examples, and the electronic apparatus 100 can obviously include supports in various locations or forms.

Figure 5:
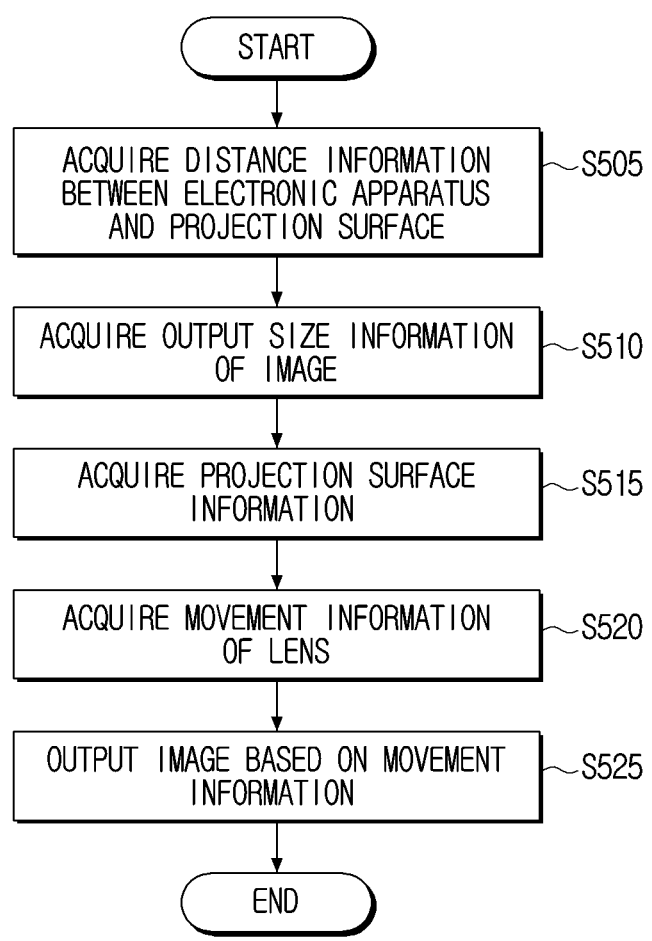
FIG. 5 is a flowchart for describing an operation of outputting an image based on movement information of a lens.

FIG. 5 is a flowchart for describing an operation of outputting an image based on movement information of a lens.

Referring to FIG. 5, the electronic apparatus 100 may acquire distance information between the electronic apparatus 100 and the projection surface (S505). Then, the electronic apparatus 100 may acquire output size information of the image (S510). Here, the output size information of the image may refer to information related to a size at which the image is output. Here, a process of calculating the output size information of the image will be described with reference to FIG. 7.

Then, the electronic apparatus 100 may acquire projection surface information (S515). Here, the projection surface information may include at least one of the number of areas configuring the projection surface, sizes of the areas, or a bend position dividing the areas.

Then, the electronic apparatus 100 may acquire movement information of the projection lens (S520). In addition, the electronic apparatus 100 may move the projection lens based on the acquired movement information. Then, the electronic apparatus 100 may output an image based on the moved projection lens (S525).

Figure 6:
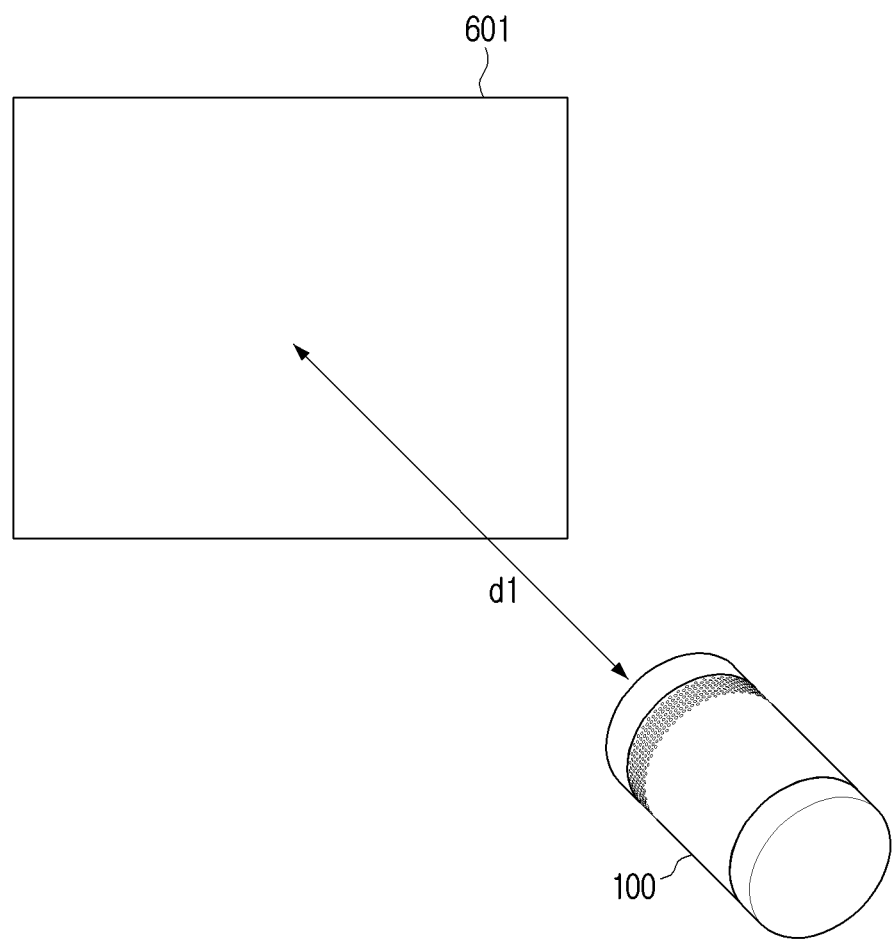
FIG. 6 is a view for describing an operation of acquiring distance information.

FIG. 6 is a view for describing an operation of acquiring distance information.

Referring to FIG. 6, the electronic apparatus 100 may acquire distance information d1 between a projection surface 601 and the electronic apparatus 100. Specifically, the electronic apparatus 100 may acquire the distance information d1 through the sensor part 113. Here, the sensor part 113 may include a distance sensor. In addition, the electronic apparatus 100 may acquire the distance information d1 using the distance sensor. Here, the distance sensor may refer to various sensors that may be used to measure a distance.

Here, the distance sensor may refer to at least one of an optical sensor using light, a sound sensor using a sound, an image sensor using a captured image, or a LiDAR sensor using radio waves.

FIG. 7 is a view for describing an operation of acquiring size information of an output image.

Referring to FIG. 7, the electronic apparatus 100 may calculate a size of an output image. Specifically, the electronic apparatus 100 may acquire a throw ratio using Equation 705. Here, the electronic apparatus 100 may pre-store the throw ratio. Here, the throw ratio may become different depending on a set state of the projection lens. For example, when the lens is in a first state, the throw ratio may correspond to 2, and when the lens is in a second state, the throw ratio may correspond to 1.5.

In addition, the electronic apparatus 100 may acquire a horizontal size of the output image based on Equation 710. Specifically, the electronic apparatus 100 may acquire a horizontal size w of the output image based on the throw ratio and distance information. Here, the distance information may be a distance between the projection surface and the electronic apparatus 100. Specifically, the electronic apparatus 100 may acquire the horizontal size w of the output image based on the throw ratio and the distance information (distance between the projection surface and the electronic apparatus 100).

In addition, the electronic apparatus 100 may compare an original aspect ratio (A:B) of the image with an aspect ratio (w:h) of the output image based on Equation 720. In addition the electronic apparatus 100 may acquire a vertical size h of the output image based on Equation 725.

As a result, the electronic apparatus 100 may acquire both the horizontal size w and the vertical size h of the output image based on the throw ratio and the distance information.

Figure 8:
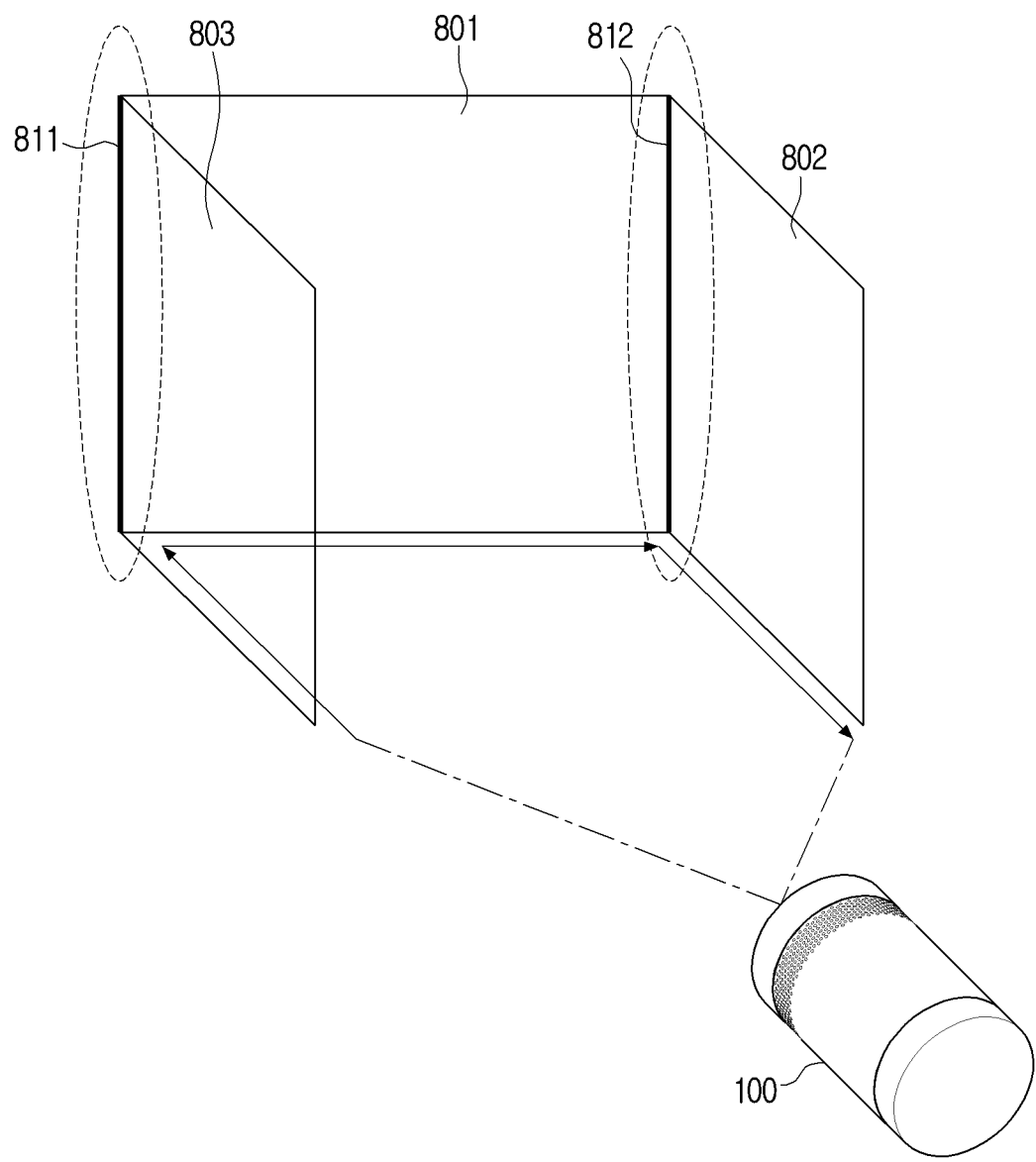
FIG. 8 is a view for describing an operation of identifying a bend position in a vertical direction.

FIG. 8 is a view for describing an operation of identifying a bend position in a vertical direction.

Referring to FIG. 8, the electronic apparatus 100 may analyze a projection surface in a horizontal direction. In addition, the electronic apparatus 100 may identify bend positions 811 and 812. In addition, the electronic apparatus 100 may divide the projection surface into a plurality of areas 801, 802, and 803 according to the identified bend positions 811 and 812. The electronic apparatus 100 may identify the plurality of areas 801, 802, and 803 divided according to the bend positions 811 and 812. Here, the bend position may be described as a boundary line, a bend line, a bend area, etc.

For example, the electronic apparatus 100 may divide a first area 801 and a third area 803 based on the bend position 811. In addition, the electronic apparatus 100 may divide the first area 801 and a second area 802 based on the bend position 812.

Meanwhile, the electronic apparatus 100 may analyze (or scan) the projection surface in a direction from the left toward the right. In addition, the electronic apparatus 100 may analyze (or scan) the projection surface in a direction from the right toward the left.

Figure 9:
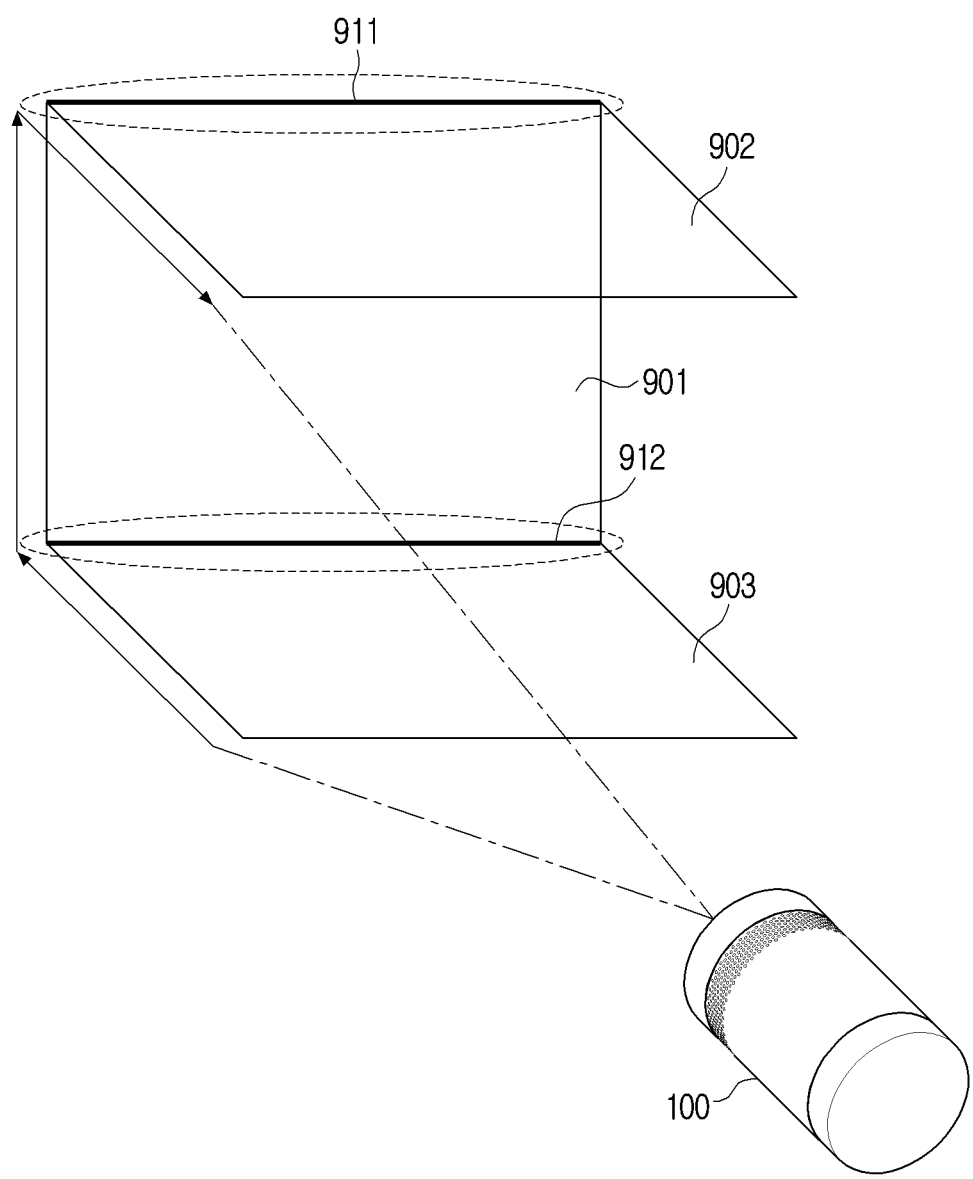
FIG. 9 is a view for describing an operation of identifying a bend position in a horizontal direction.

FIG. 9 is a view for describing an operation of identifying a bend position in a horizontal direction.

Referring to FIG. 9, the electronic apparatus 100 may analyze a projection surface in a vertical direction. In addition, the electronic apparatus 100 may identify bend positions 911 and 912. In addition, the electronic apparatus 100 may divide the projection surface into a plurality of areas 901, 902, and 903 according to the identified bend positions 911 and 912. The electronic apparatus 100 may identify the plurality of areas 901, 902, and 903 divided according to the bend positions 911 and 912.

For example, the electronic apparatus 100 may divide a first area 901 and a second area 902 based on the bend position 911. In addition, the electronic apparatus 100 may divide the first area 901 and a third area 903 based on the bend position 912.

Meanwhile, the electronic apparatus 100 may analyze (or scan) the projection surface in a direction from the lower side toward the upper side. In addition, the electronic apparatus 100 may analyze (or scan) the projection surface in a direction from the upper side toward the lower side.

Figure 10:
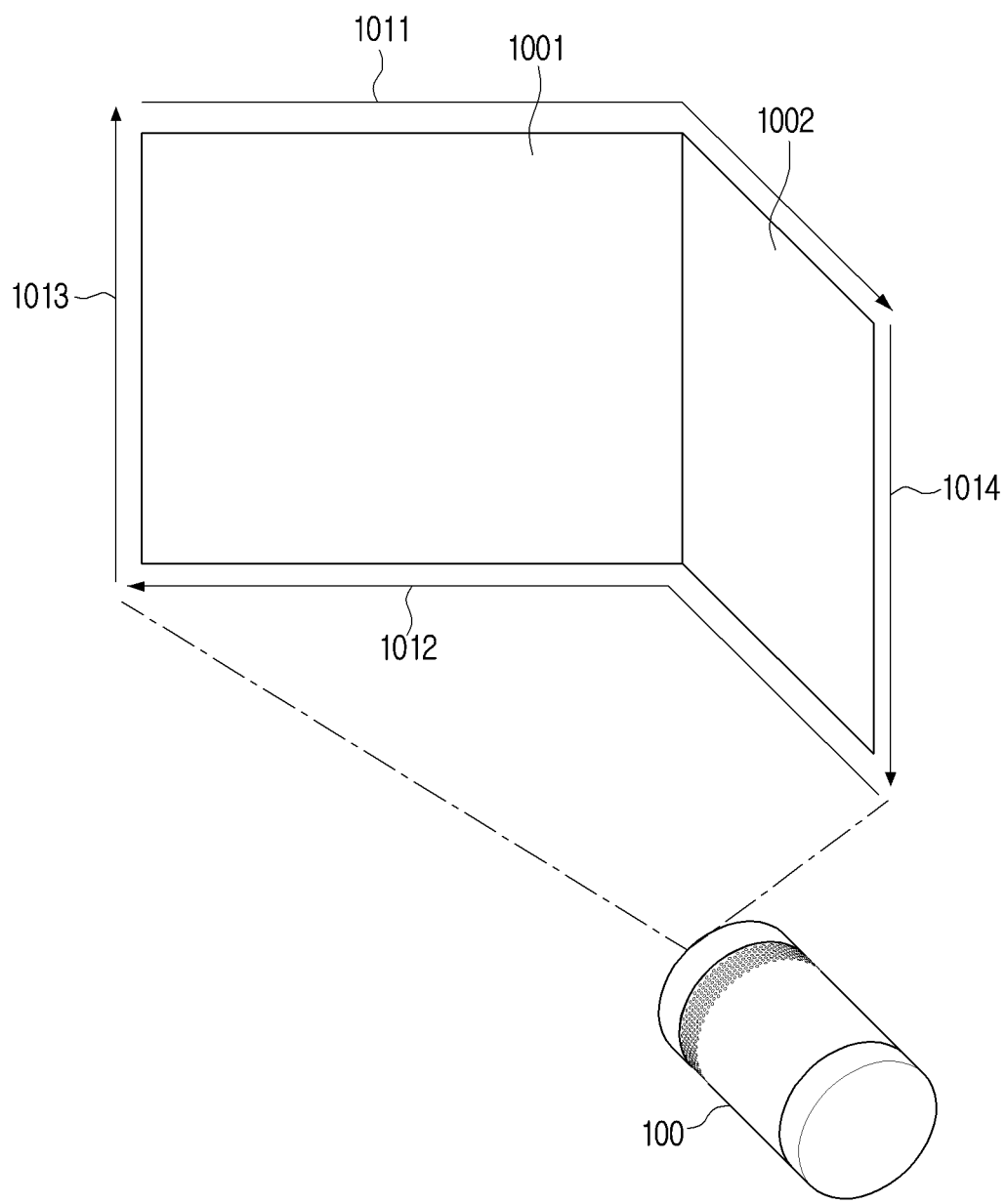
FIG. 10 is a view for describing an operation of analyzing a projection surface.

FIG. 10 is a view for describing an operation of analyzing a projection surface.

Referring to FIG. 10, the electronic apparatus 100 may analyze a projection surface of a space in which the electronic apparatus 100 is disposed. Here, the electronic apparatus 100 may analyze the projection surface in a direction 1011 from the left toward the right. In addition, the electronic apparatus 100 may analyze the projection surface in a direction 1012 from the right toward the left. In addition, the electronic apparatus 100 may analyze the projection surface in the direction 1011 from the left toward the right and the direction 1012 from the right toward the left to identify a bend in the vertical direction.

Here, the electronic apparatus 100 may analyze the projection surface in a direction 1013 from the lower side toward the upper side after identifying the bend in the vertical direction. In addition, the electronic apparatus 100 may analyze the projection surface in a direction 1014 from the upper side to the lower side. In addition, the electronic apparatus 100 may analyze the projection surface in the direction 1013 from the lower side toward the upper side and the direction 1014 from the upper side toward the lower side to identify a bend in the horizontal direction.

In addition, the electronic apparatus 100 may analyze the projection surface in upward, downward, leftward, and rightward directions to identify a first area 1001 and a second area 1002

Figure 11:
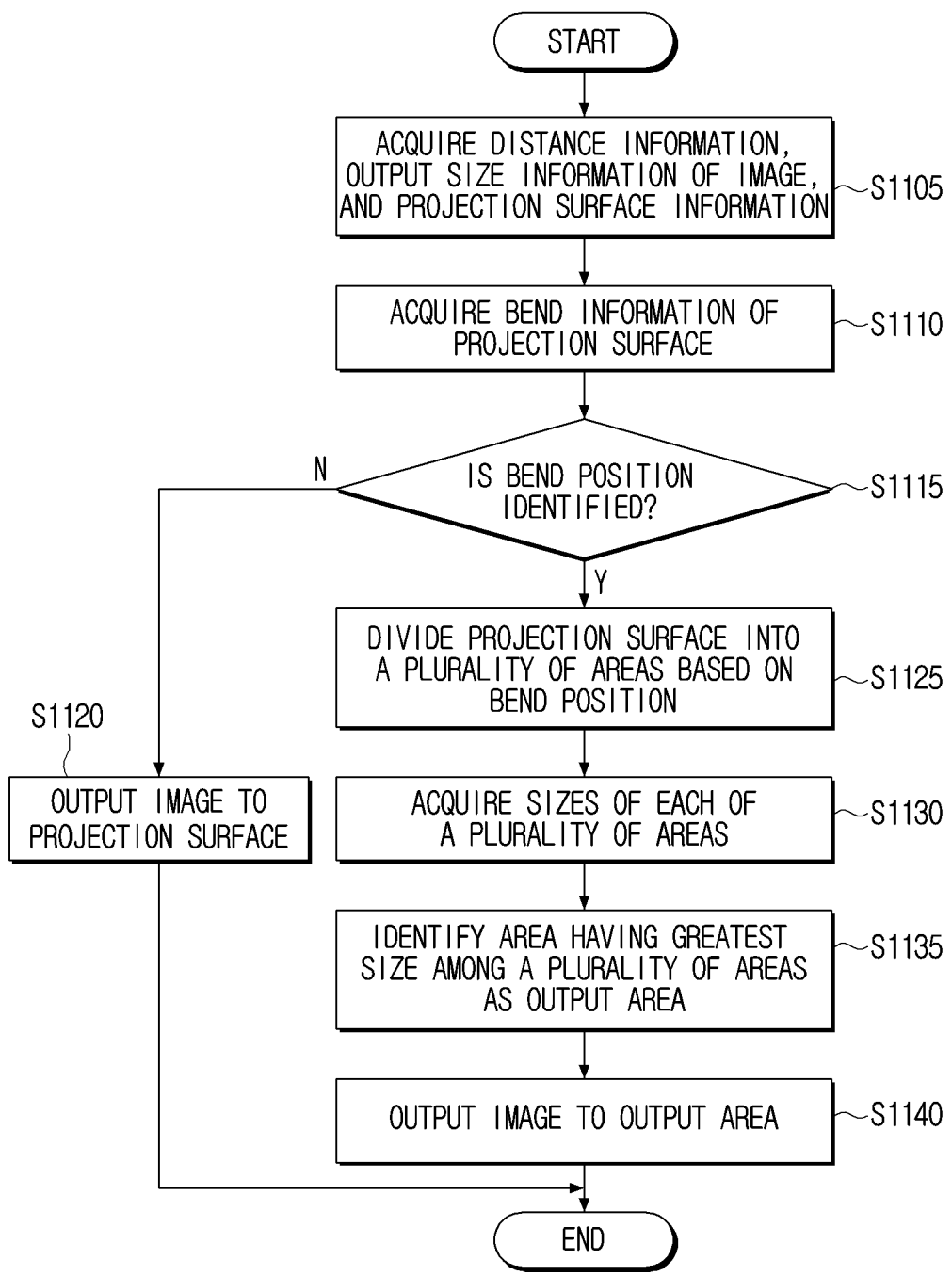
FIG. 11 is a flowchart for describing an operation of identifying one of a plurality of areas included in a projection surface as an output area, according to an embodiment.

FIG. 11 is a flowchart for describing an operation of identifying one of a plurality of areas included in a projection surface as an output area, according to an embodiment.

Referring to FIG. 11, the electronic apparatus 100 may acquire distance information, output size information of an image, and projection surface information (S1105). Then, the electronic apparatus 100 may acquire bend information of the projection surface (S1110). Here, the bend information of the projection surface may include at least one of whether or not the projection surface includes a bend, a bend position, or a bend length. Here, the bend may be described as a boundary line, a bend line, a bend area, etc.

Then, the electronic apparatus 100 may determine whether or not the bend position is identified based on the bend information (S1115). When the bend position is not identified on the projection surface (S1115-N), the electronic apparatus 100 may output an image to the projection surface (S1120). When the bend position is identified on the projection surface (S1115-Y), the electronic apparatus 100 may divide the projection surface into a plurality of areas based on the bend position (S1125).

Meanwhile, the electronic apparatus 100 may acquire sizes of each of the plurality of areas (S1130). Then, the electronic apparatus 100 may identify an area having the greatest size among the plurality of areas as the output area (S1135). Then, the electronic apparatus 100 may output an image to the output area (S1140).

FIG. 12 is a view for describing an operation of dividing a projection surface into a plurality of areas.

Referring to FIG. 12, the electronic apparatus 100 may analyze a projection surface. In addition, the electronic apparatus 100 may identify a bend position 1211 included in the projection surface. Here, the bend position may be described as a bend line, a boundary line, a boundary area, a bend area, etc. The electronic apparatus 100 may divide the projection surface into a first area 1201 and a second area 1202 based on the bend position 1211.

FIG. 13 is a view for describing an operation of identifying one of the plurality of areas as an output area.

Referring to FIG. 13, the electronic apparatus 100 may identify one of the first area 1201 and the second area 1202 divided based on the bend position 1211 of FIG. 12 as an output area.

Here, the electronic apparatus 100 may identify sizes of each of the plurality of areas. In addition, the electronic apparatus 100 may identify an area having a greater size (or width) among the plurality of areas as the output area. For example, the electronic apparatus 100 may acquire a size of the first area 1201 as 20 m² and acquire a size of the second area 1202 as 10 m². In addition, the electronic apparatus 100 may identify the first area 1201 having a greater area as an output area 1301. The electronic apparatus 100 may output an image to the output area 1301.

FIG. 14 is a view for describing an operation of identifying an area excluding an object on the projection surface as an output area.

Referring to FIG. 14, the electronic apparatus 100 may identify an object included in the projection surface in identifying the output area. Here, the object may refer to a predetermined object hindering image output, such as a picture frame, a furniture, and home appliances.

Here, the predetermined object may refer to an obstacle distorting the output image. Accordingly, the electronic apparatus 100 may identify an object 1402 positioned on the projection surface and identify an output area 1401 excluding an area in which the object 1402 is positioned. In addition, the electronic apparatus 100 may output an image to the output area 1401.

Figure 15:
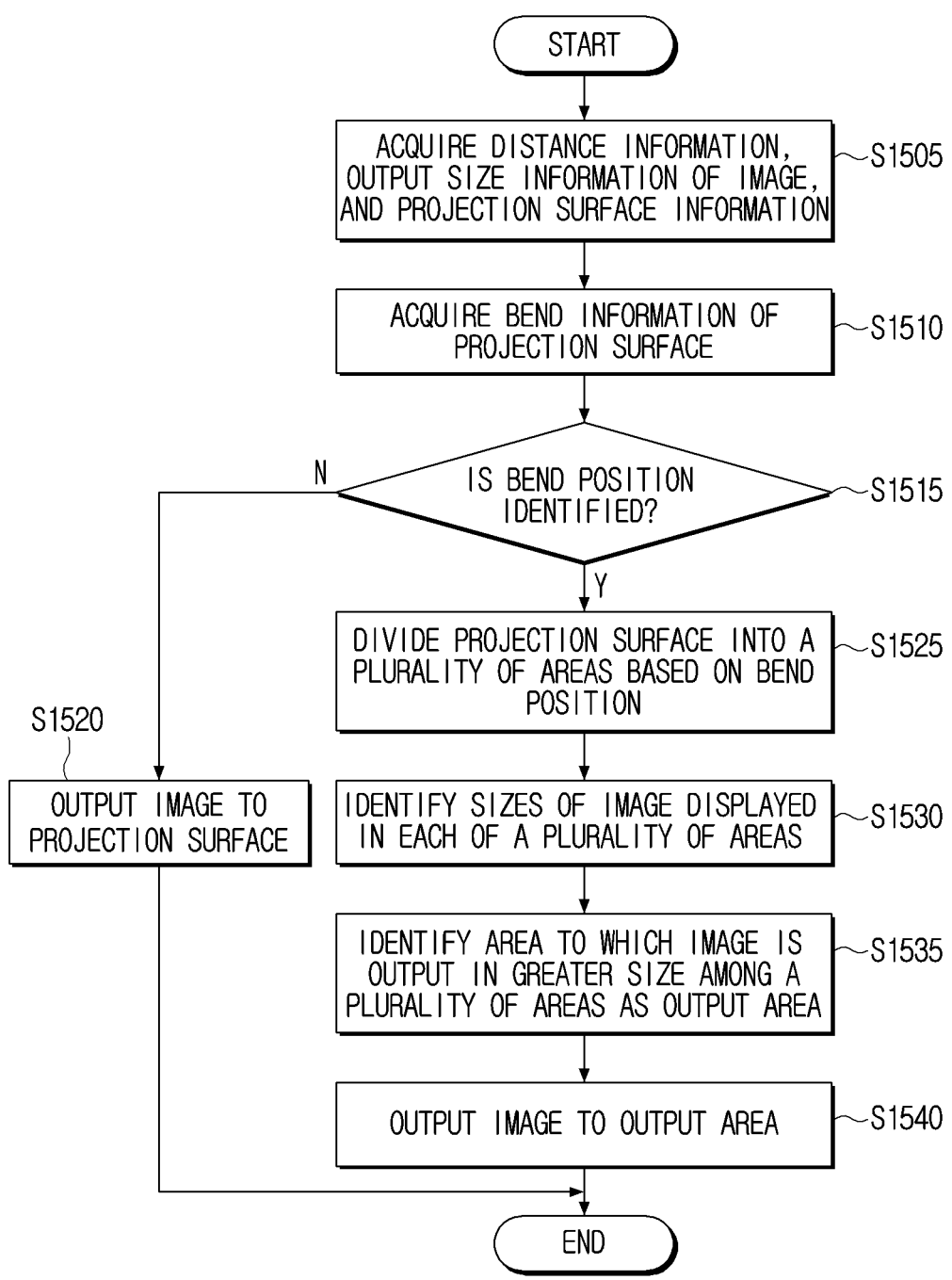
FIG. 15 is a flowchart for describing an operation of identifying one of a plurality of areas included in a projection surface as an output area, according to an another embodiment.

FIG. 15 is a flowchart for describing an operation of identifying one of a plurality of areas included in a projection surface as an output area, according to an another embodiment.

Referring to FIG. 15, the electronic apparatus 100 may acquire distance information, output size information of an image, and projection surface information (S1505). Then, the electronic apparatus 100 may acquire bend information of the projection surface (S1510). Here, the bend information of the projection surface may include at least one of whether or not the projection surface includes a bend, a bend position, or a bend length. Here, the bend may be described as a boundary line, a bend line, a bend area, etc.

Then, the electronic apparatus 100 may determine whether or not the bend position is identified based on the bend information (S1515). When the bend position is not identified on the projection surface (S1515-N), the electronic apparatus 100 may output an image to the projection surface (S1520). When the bend position is identified on the projection surface (S1515-Y), the electronic apparatus 100 may divide the projection surface into a plurality of areas based on the bend position (S1525).

Meanwhile, the electronic apparatus 100 may identify sizes of an image displayed in each of the plurality of areas (S1530). Specifically, the image output to the projection surface may be output over a plurality of areas. Here, the electronic apparatus 100 may acquire sizes of an image output to each of the plurality of areas.

Then, the electronic apparatus 100 may identify an area to which an image is output in a greater size among the plurality of areas as an output area (S1535). Then, the electronic apparatus 100 may output an image to the output area (S1540). This will be described in detail with reference to FIG. 16.

Figure 16:
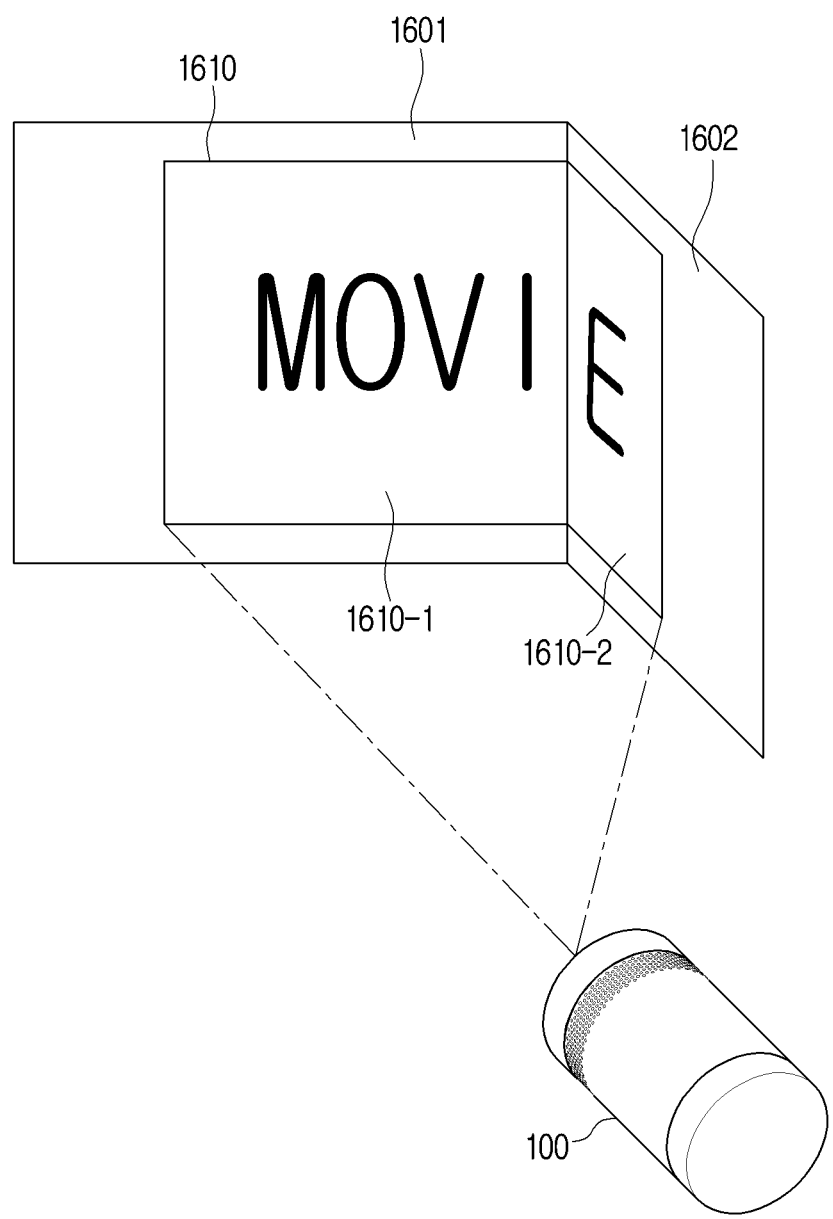
FIG. 16 is a view for describing an operation of identifying a size of an area to which an image is output in each of a plurality of areas.

FIG. 16 is a view for describing an operation of identifying a size of an area to which an image is output in each of a plurality of areas.

Referring to FIG. 16, the electronic apparatus 100 may divide a projection surface into a first area 1601 and a second area 1602. In addition, the electronic apparatus 100 may output one image 1610 to the first area 1601 and the second area 1602. Here, the electronic apparatus 100 may determine one of the first area 1601 and the second area 1602 as an output area.

Here, the electronic apparatus 100 may identify sizes of the image 1610 output to each of the first area 1601 and the second area 1602. The image 1610 may be in a state in which it is output over the first area 1601 and the second area 1602. Here, the electronic apparatus 100 may capture the image 1610 output through the sensor part 113. Here, the sensor part 113 may be an image sensor. The electronic apparatus 100 may analyze the captured image 1610 to identify a first portion 1610-1 of the image 1610 output to the first area 1601 and a second portion 1610-2 of the image 1610 output to the second area 1602. Then, the electronic apparatus 100 may acquire a size of the first portion 1610-1 and a size of the second portion 1610-2.

In addition, the electronic apparatus 100 may identify an area to which a portion having a greater size belongs as an output area. For example, it is assumed that the size of the first portion 1610-1 is 10 m² and the size of the second portion 1610-2 is 3 m². The electronic apparatus 100 may determine the first area 1601 to which the first portion 1610-1 having a greater size belongs as the output area. In addition, the electronic apparatus 100 may output an image only to the first area 1601.

Figure 17:
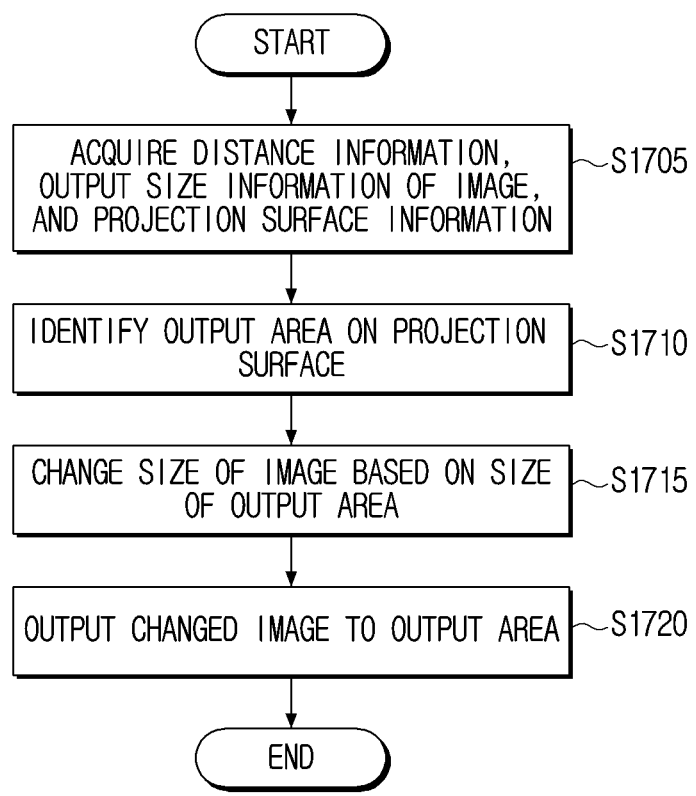
FIG. 17 is a flowchart for describing an operation of changing a size of an image based on a size of an output area.

FIG. 17 is a flowchart for describing an operation of changing a size of an image based on a size of an output area.

Referring to FIG. 17, the electronic apparatus 100 may acquire distance information, output size information of an image, and projection surface information (S1705). Then, the electronic apparatus 100 may identify an output area on a projection surface (S1710). Then, the electronic apparatus 100 may change a size of an image based on a size of the output area (S1715). Then, the electronic apparatus 100 may output the changed image to the output area (S1720).

Figure 18:
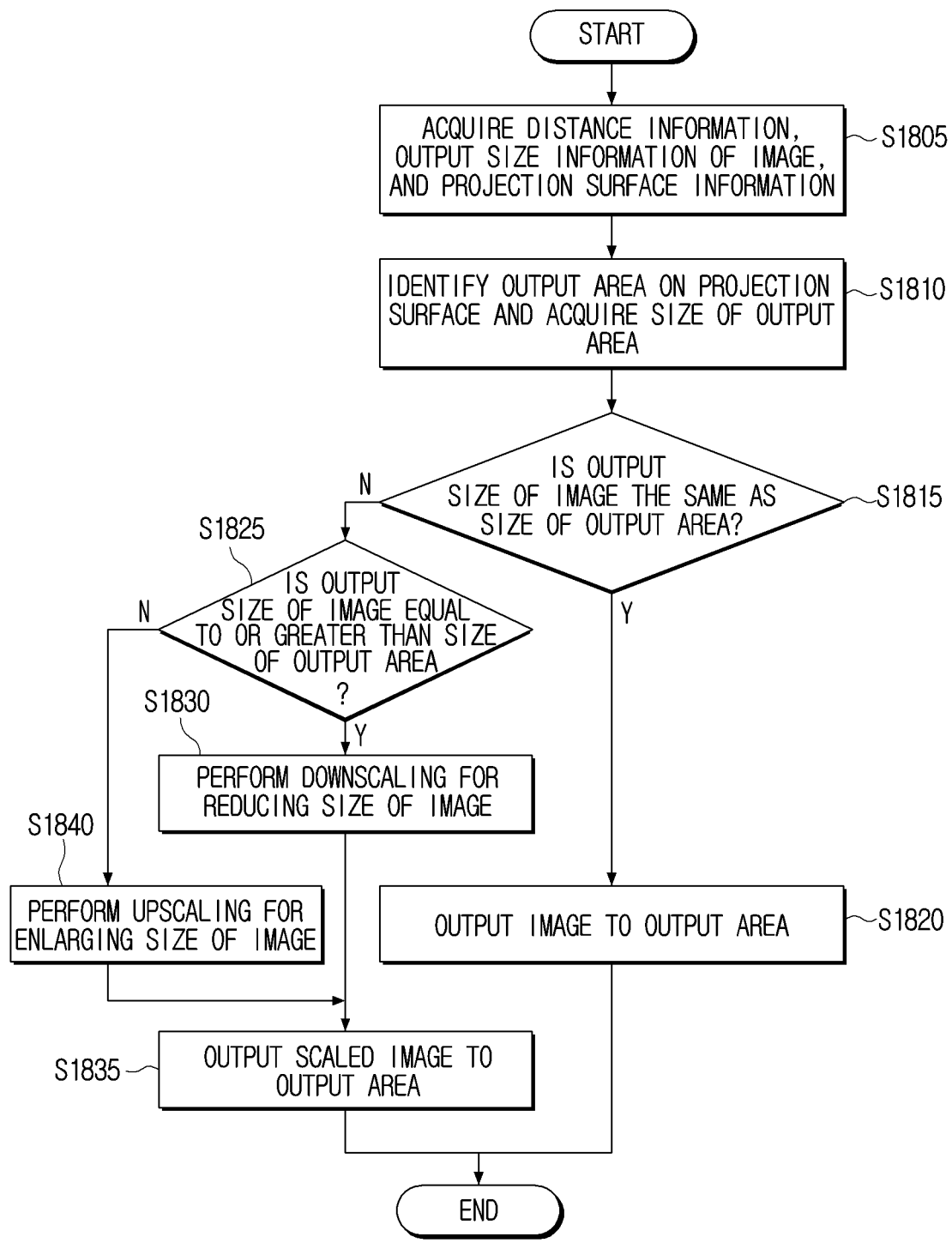
FIG. 18 is a flowchart for describing an operation of comparing an output size of an image and a size of an output area with each other.

FIG. 18 is a flowchart for describing an operation of comparing an output size of an image and a size of an output area with each other.

Referring to FIG. 18, the electronic apparatus 100 may acquire distance information, output size information of an image, and projection surface information (S1805). Then, the electronic apparatus 100 may identify an output area on a projection surface and acquire a size of the output area (S1810).

Then, the electronic apparatus 100 may identify whether or not an output size of the image is the same as the size of the output area (S1815). Here, if the output size of the image is the same as the size of the output area (S1815-Y), the electronic apparatus 100 may output the image to the output area (S1820).

If the output size of the image is not the same as the size of the output area (S1815-N), the electronic apparatus 100 may identify whether or not the output size of the image is equal to or greater than the size of the output area (S1825). Here, if the output size of the image is equal to or is greater than the size of the output area (S1825-Y), the electronic apparatus 100 may perform downscaling for reducing the size of the image (S1830). Then, the electronic apparatus 100 may output the scaled image to the output area (S1835).

On the other hand, if the output size of the image is less than the size of the output area (S1825-N), the electronic apparatus 100 may perform upscaling for enlarging the size of the image (S1840). Then, the electronic apparatus 100 may output the scaled image to the output area (S1835).

Figure 19:
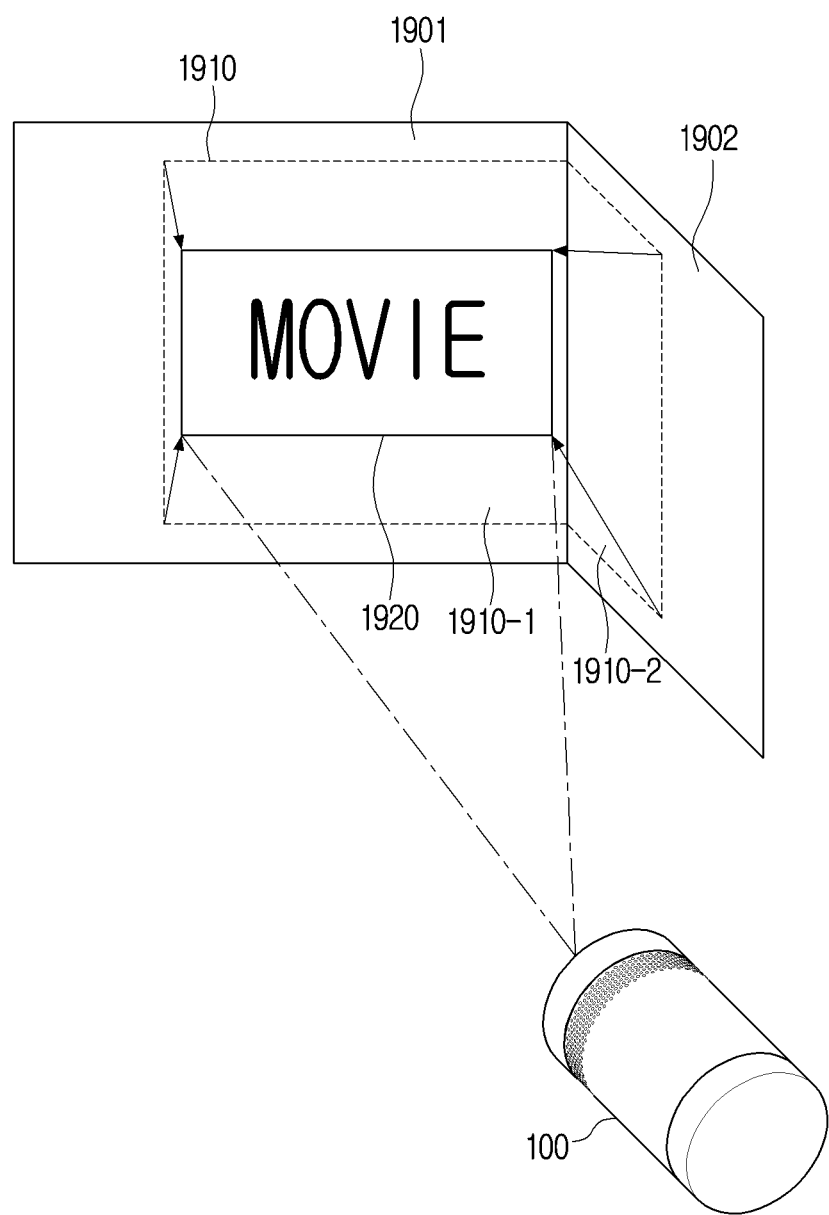
FIG. 19 is a view for describing an operation of reducing a size of an image and outputting the image of which the size is reduced, according to an embodiment.

FIG. 19 is a view for describing an operation of reducing a size of an image and outputting the image of which the size is reduced, according to an embodiment.

Referring to FIG. 19, the electronic apparatus 100 may analyze a projection surface to divide a first area 1901 and a second area 1902. In addition, the electronic apparatus 100 may determine the first area 1901 of the two areas as an output area.

When an uncorrected image is output as it is, the image may be output over the first area 1901 and the second area 1902, similar to FIG. 16. When the image is not corrected, the electronic apparatus 100 may correct the image based on a size of an area 1910 to which the image is output.

Specifically, the electronic apparatus 100 may identify an area 1910-1 existing in the first area 1901 and an area 1910-2 existing in the second area 1902 in the area 1910 to which the uncorrected image is output. In addition, the electronic apparatus 100 may determine to output the image only to the area 1910-1 existing in the first area 1901, which is the output area. Here, the area 1910-1 may be a detailed output area.

A size of the area 1910-1, which is the detailed output area, may be smaller than a size of the uncorrected image. Accordingly, the electronic apparatus 100 may acquire a corrected image 1920 by changing the size of the image based on the size of the area 1910-1, which is the detailed output area. Here, the electronic apparatus 100 may perform a downscaling operation to change the size of the image to be small. According to an embodiment, the electronic apparatus 100 may maintain an aspect ratio of the image in performing the downscaling operation. According to another embodiment, the electronic apparatus 100 may not maintain an aspect ratio of the image in performing the downscaling operation.

In addition, the electronic apparatus 100 may output the corrected image 1920 to the area 1910-1.

Figure 20:
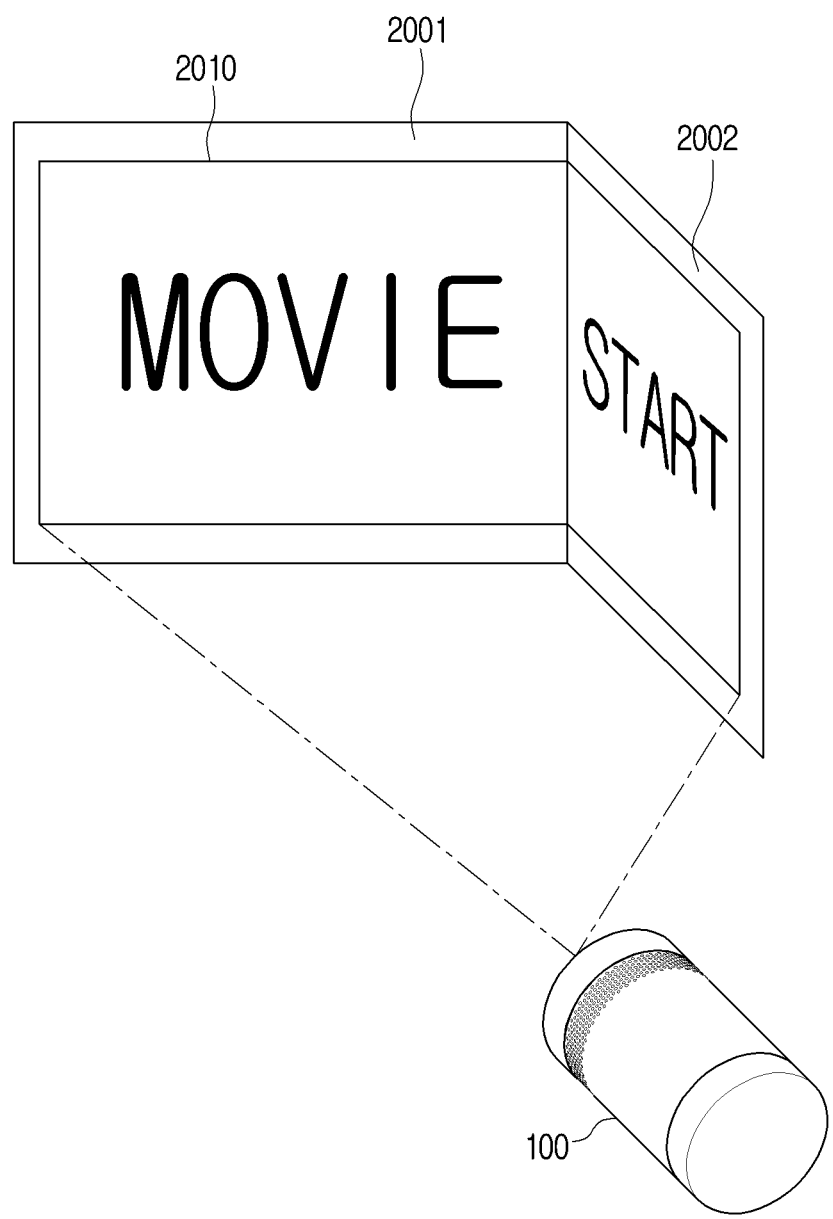
FIG. 20 is a view for describing an embodiment in which an image is displayed in all of a plurality of areas connected to each other in a horizontal direction.

FIG. 20 is a view for describing an embodiment in which an image is displayed in all of a plurality of areas connected to each other in a horizontal direction.

Referring to FIG. 20, the electronic apparatus 100 may divide a projection surface into a first area 2001 and a second area 2002. In addition, the electronic apparatus 100 may output an image 2010 to the projection surface. A size of the image 2010 may be greater than a size of the first area 2001. Accordingly, the image 2010 may be output over both the first area 2001 and the second area 2002.

For example, the image 2010 may include a content "MOVIE START". Here, a "MOVIE" portion may be output to the first area 2001 and a "START" portion may be output to the second area 2002. When the image 2010 is output over the first area 2001 and the second area 2002, the image 2010 may be distorted.

Figure 21:
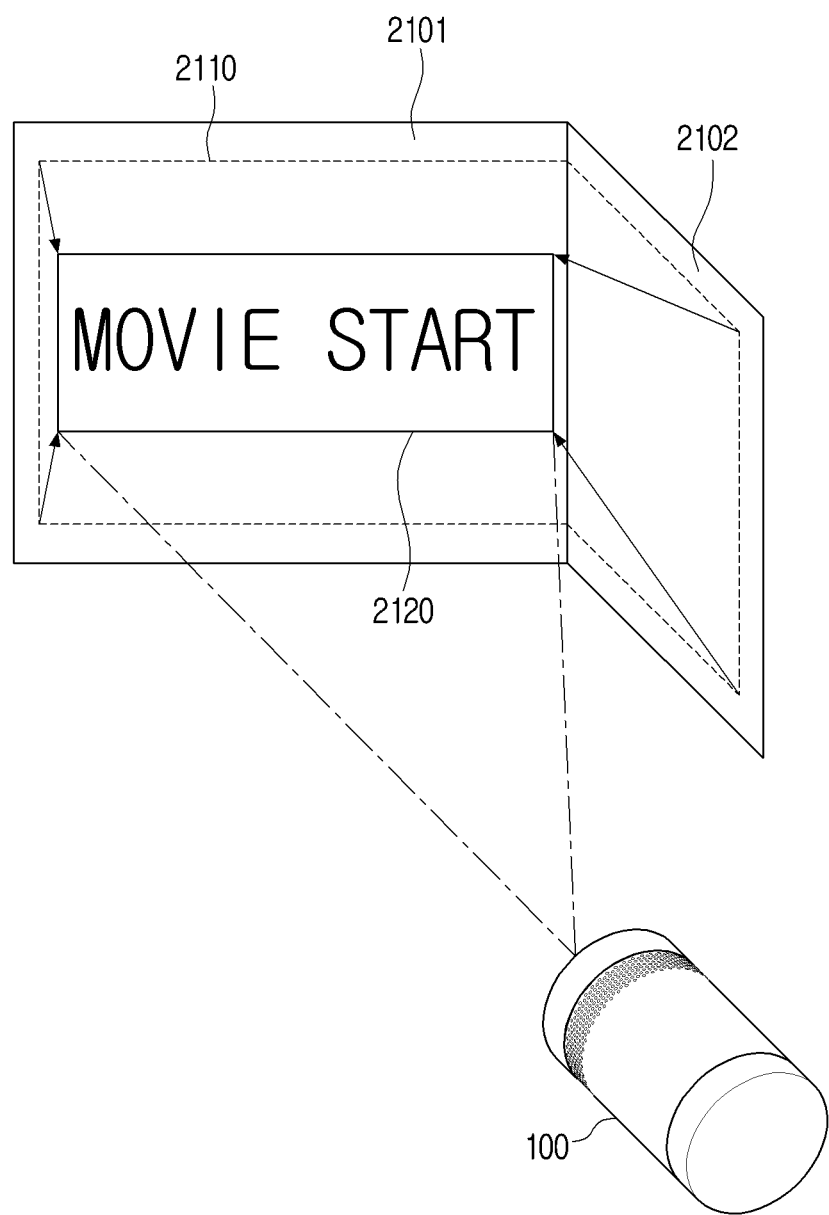
FIG. 21 is a view for describing an operation of reducing a size of an image and outputting the image of which the size is reduced, according to another embodiment.

FIG. 21 is a view for describing an operation of reducing a size of an image and outputting the image of which the size is reduced, according to another embodiment.

Referring to FIG. 21, the electronic apparatus 100 may divide a projection surface into a first area 2101 and a second area 2102. Here, the first area 2101 and the second area 2102 may correspond to the first area 2001 and the second area 2002 of FIG. 20, respectively. In addition, an area 2110 may refer to an area to which the uncorrected image 2010 of FIG. 20 may be output.

The electronic apparatus 100 may determine the first area 2101 as an output area and acquire a size of the output area. In addition, the electronic apparatus 100 may acquire a corrected image 2120 by changing a size of the image based on the size of the first area 2101. In addition, the electronic apparatus 100 may output the corrected image 2120 to the first area 2101.

Figure 22:
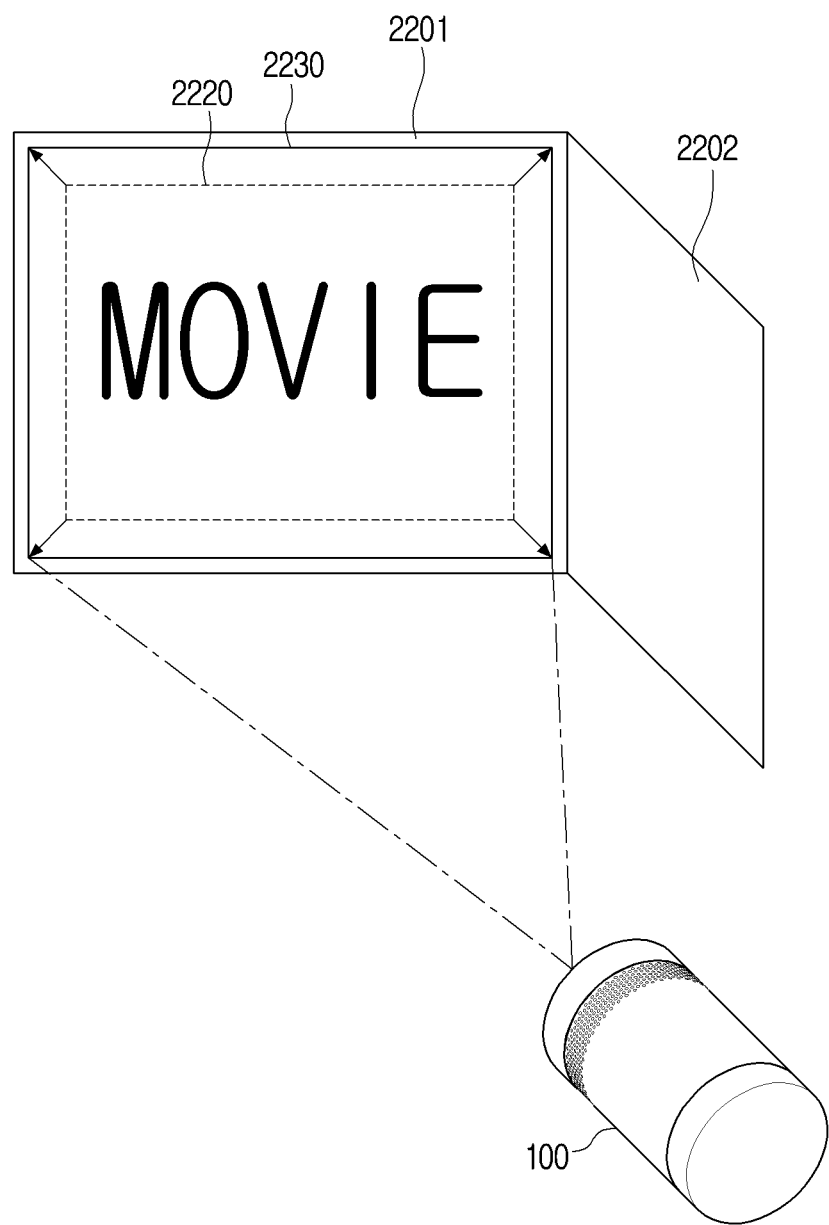
FIG. 22 is a view for describing an operation of expanding a size of an image and outputting the image of which the size is expanded.

FIG. 22 is a view for describing an operation of expanding a size of an image and outputting the image of which the size is expanded.

Referring to FIG. 22, the electronic apparatus 100 may divide a projection surface into a first area 2201 and a second area 2202. In addition, the electronic apparatus 100 may determine the first area 2201 as an output area, and may acquire a size of the first area 2201. In addition, the electronic apparatus 100 may change a size of an image based on the size of the first area 2201.

For example, it is assumed that the size of the first area 2201 is greater than the size of the image. Here, an area 2220 may be an area to which an image before being corrected is output. Here, a size of the area 2220 to which the image before being corrected is output may be smaller than the size of the first area 2201. To provide a screen as great as possible to a viewer, the electronic apparatus 100 may enlarge the size of the image.

Here, the electronic apparatus 100 may perform an upscaling operation for enlarging the size of the image. In addition, the electronic apparatus 100 may acquire a corrected image 2230 through the up-scaling operation. In addition, the electronic apparatus 100 may output the corrected image 2230 to the first area 2201.

Meanwhile, according to another embodiment, the area 2220 may be an area to which an image output based on movement information is output. For example, the electronic apparatus 100 may move the image 1610 of FIG. 16 to the left so that the image 1610 is output to the output area. Here, the area 2220 of FIG. 22 may be an area to which the image 1610 of FIG. 16 is moved to the left and output. An operation of moving and outputting the image 1610 will be described with reference to FIGS. 23 to 26.

Figure 23:
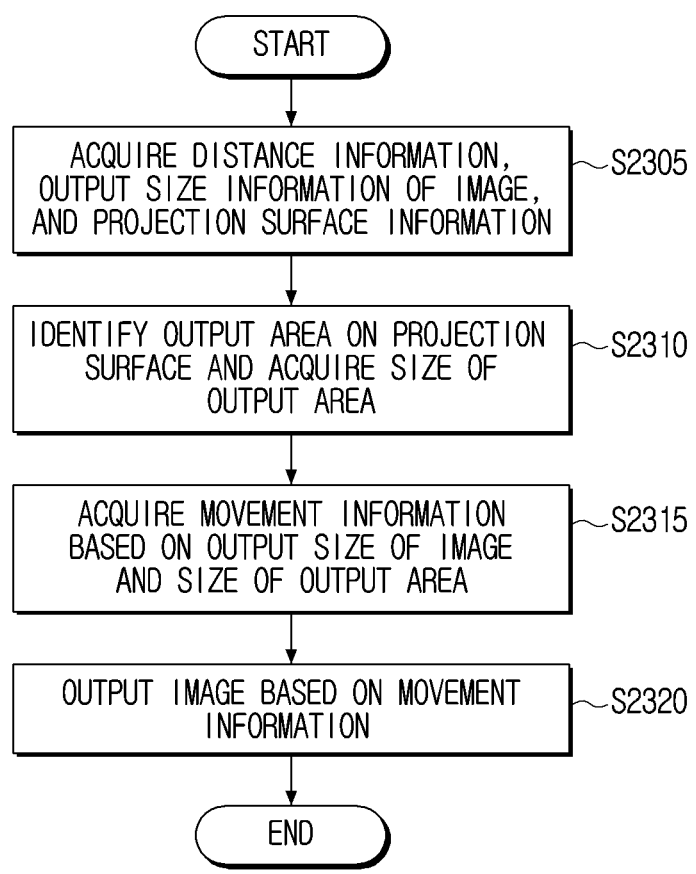
FIG. 23 is a flowchart for describing an operation of outputting an image based on movement information of a projection lens.

FIG. 23 is a flowchart for describing an operation of outputting an image based on movement information of a projection lens.

Referring to FIG. 23, the electronic apparatus 100 may acquire distance information, output size information of an image, and projection surface information (S2305). Then, the electronic apparatus 100 may identify an output area on a projection surface and acquire a size of the output area (S2310). Then, the electronic apparatus 100 may acquire movement information based on an output size of the image and the size of the output area (S2315). Here, the movement information may refer to information related to movement of the projection lens 110 included in the projection part 111. Then, the electronic apparatus 100 may output the image based on the movement information (S2320). Specifically, the electronic apparatus 100 may move the projection lens 110 based on the movement information and output the image through the moved projection lens 110.

Figure 24:
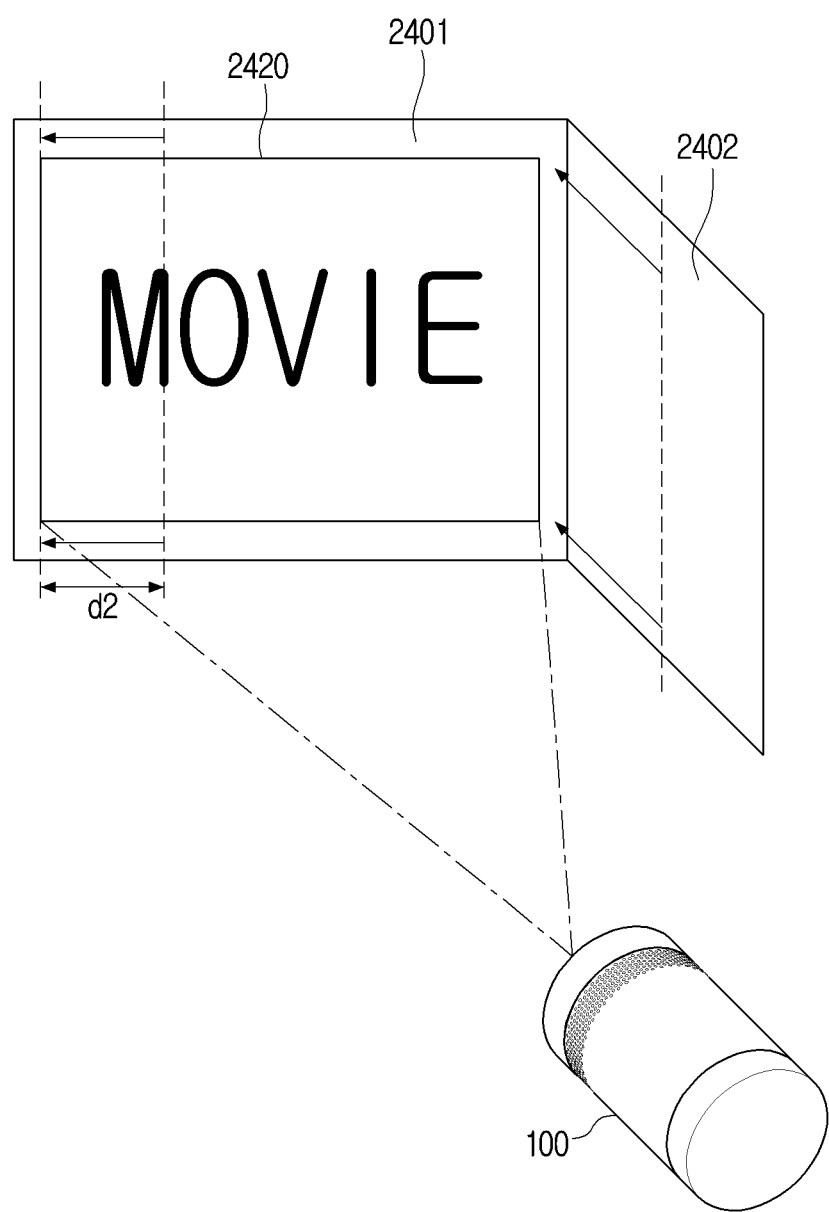
FIG. 24 is a view for describing an operation of changing a position at which an image is output, according to an embodiment.

FIG. 24 is a view for describing an operation of changing a position at which an image is output, according to an embodiment.

Referring to FIG. 24, the electronic apparatus 100 may analyze a projection surface to identify a first area 2401 and a second area 2402. Here, as in an embodiment of FIG. 16, there may be a situation in which the image 1610 is output over the plurality of areas. The electronic apparatus 100 may determine one of the plurality of areas as an output area so that the image is not output to the plurality of areas. For example, it is assumed that the first area 2401 of the first area 2401 or the second area 2402 is determined as the output area.

The electronic apparatus 100 may change an output position of the image to output an image 2420 only to the first area 2401. Here, the image 2420 may be an image output at a changed position. The image 2420 may be an image moved to the left by a calculated distance d2.

Here, a position at which the image 2420 is displayed (or the calculated distance) may be determined based on a size of the output area and an output size of the image 2420. Here, the electronic apparatus 100 may output the final image 2420 in additional consideration of the output area and position information on the position at which the image 2420 is displayed.

Specifically, the electronic apparatus 100 may determine a final output area of the image 2420 based on a position and a size of the image 2420 output before being moved and a position and a size of the output area 2401.

In addition, the electronic apparatus 100 may output the image 2420 to the output area.

Figure 25:
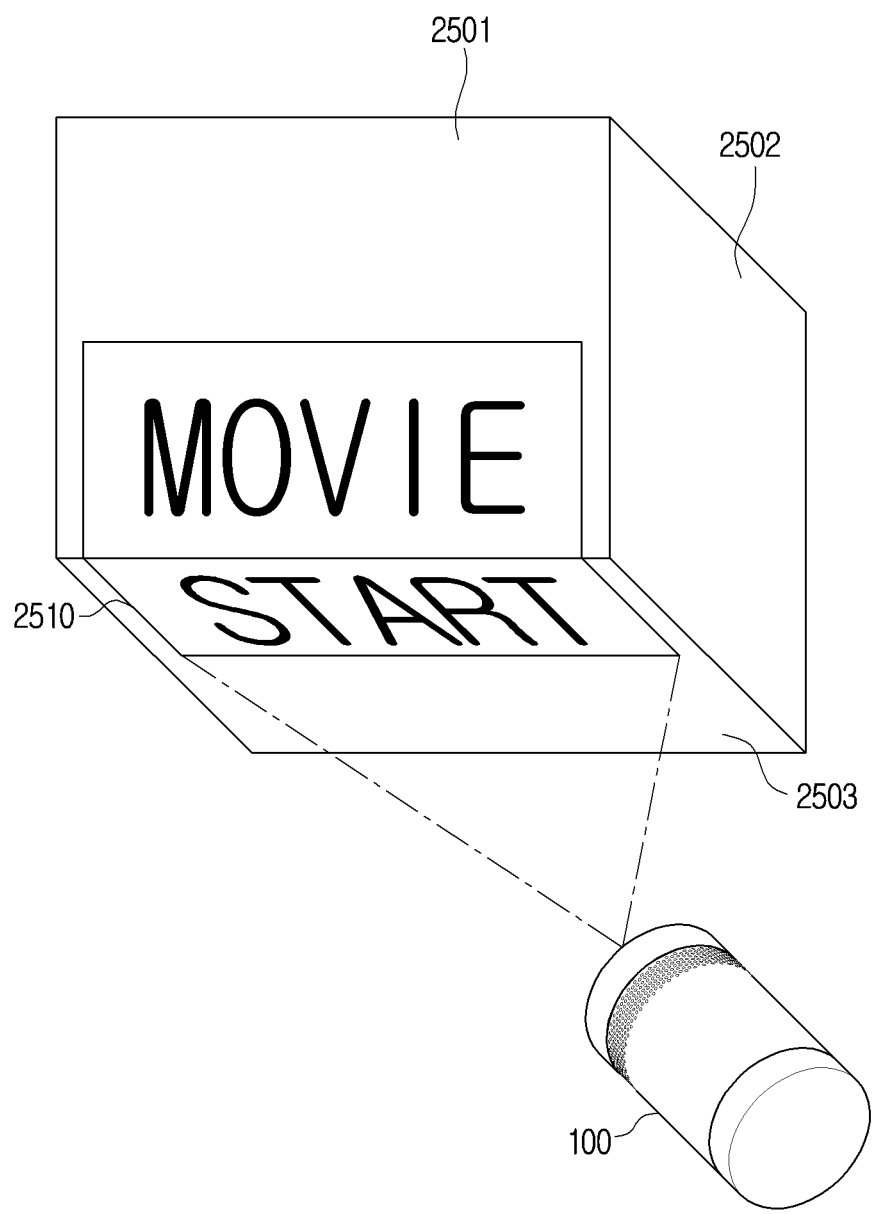
FIG. 25 is a view for describing an embodiment in which an image is displayed in all of a plurality of areas connected to each other in a vertical direction.

FIG. 25 is a view for describing an embodiment in which an image is displayed in all of a plurality of areas connected to each other in a vertical direction.

Referring to FIG. 25, the electronic apparatus 100 may analyze a projection surface to identify a first area 2501, a second area 2502, and a third area 2503. Here, the image 2510 may be output over the first area 2501 and the third area 2503. Here, the first area 2501 may be an area corresponding to a front surface based on an output direction of the electronic apparatus 100, and the third area 2503 may be an area corresponding to a bottom surface of the electronic apparatus 100.

If an image 2510 is displayed over the first area 2501 and the third area 2503, the image may be distorted.

Figure 26:
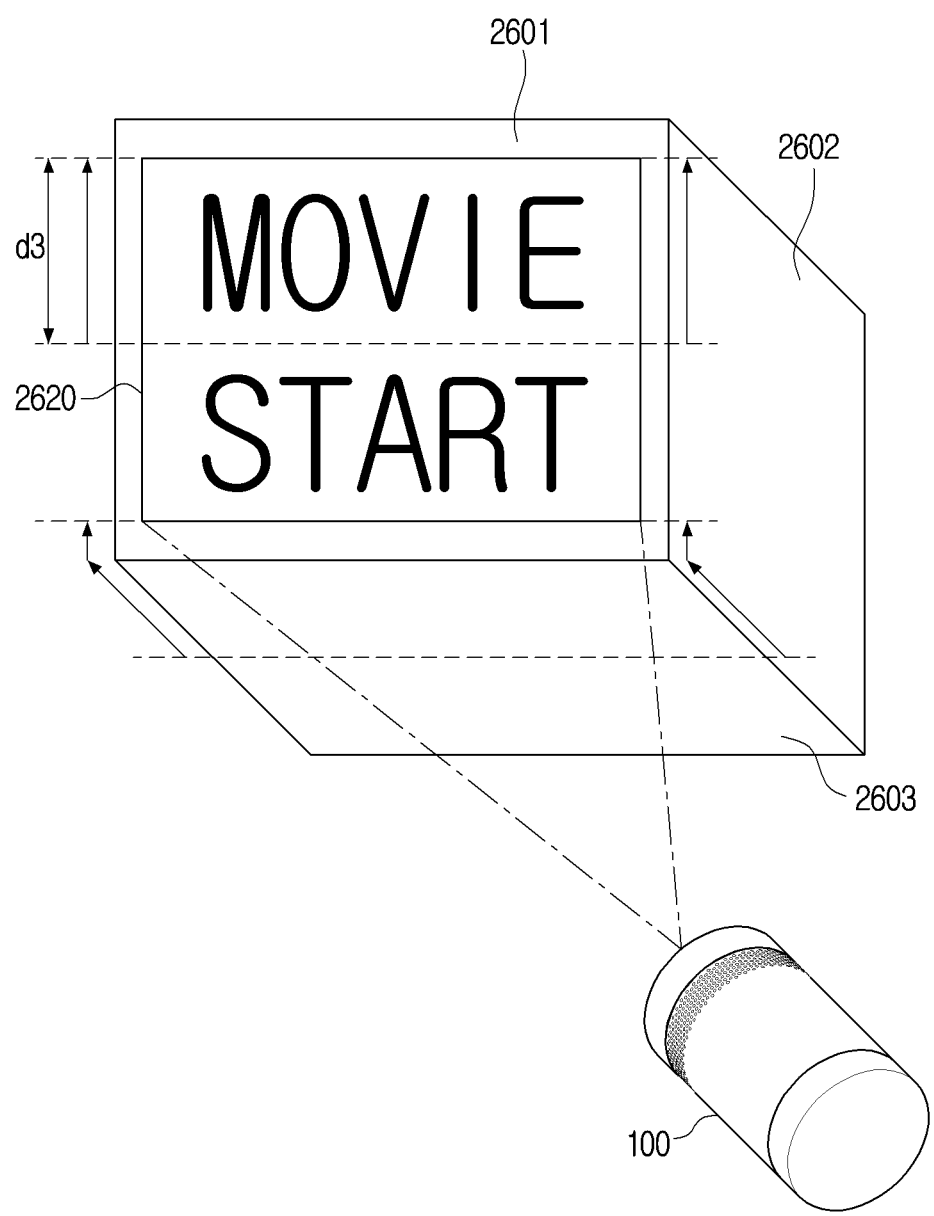
FIG. 26 is a view for describing an operation of changing a position at which an image is output, according to another embodiment.

FIG. 26 is a view for describing an operation of changing a position at which an image is output, according to another embodiment.

Referring to FIG. 26, the electronic apparatus 100 may divide a projection surface into a first area 2601, a second area 2602, and a third area 2603. A situation in which an image 2620 may be displayed over the first area 2601 and the third area 2603 if an output position of the image 2620 is not changed as illustrated in FIG. 25 is assumed.

Here, the electronic apparatus 100 may move the image 2620 upward and output the upward moved image. Here, the electronic apparatus 100 may move the image 2620 by a calculated distance d3 and output the moved image 2620.

Here, a position at which the image 2620 is displayed (or the calculated distance) may be determined based on a size of the output area and an output size of the image 2620. Here, the electronic apparatus 100 may output the final image 2620 in additional consideration of the output area and position information on the position at which the image 2620 is displayed.

Specifically, the electronic apparatus 100 may determine a final output area of the image 2620 based on a position and a size of the image 2601 output before being moved and a position and a size of the output area 2620. In addition, the electronic apparatus 100 may output the image 2620 to the output area.

Figure 27:
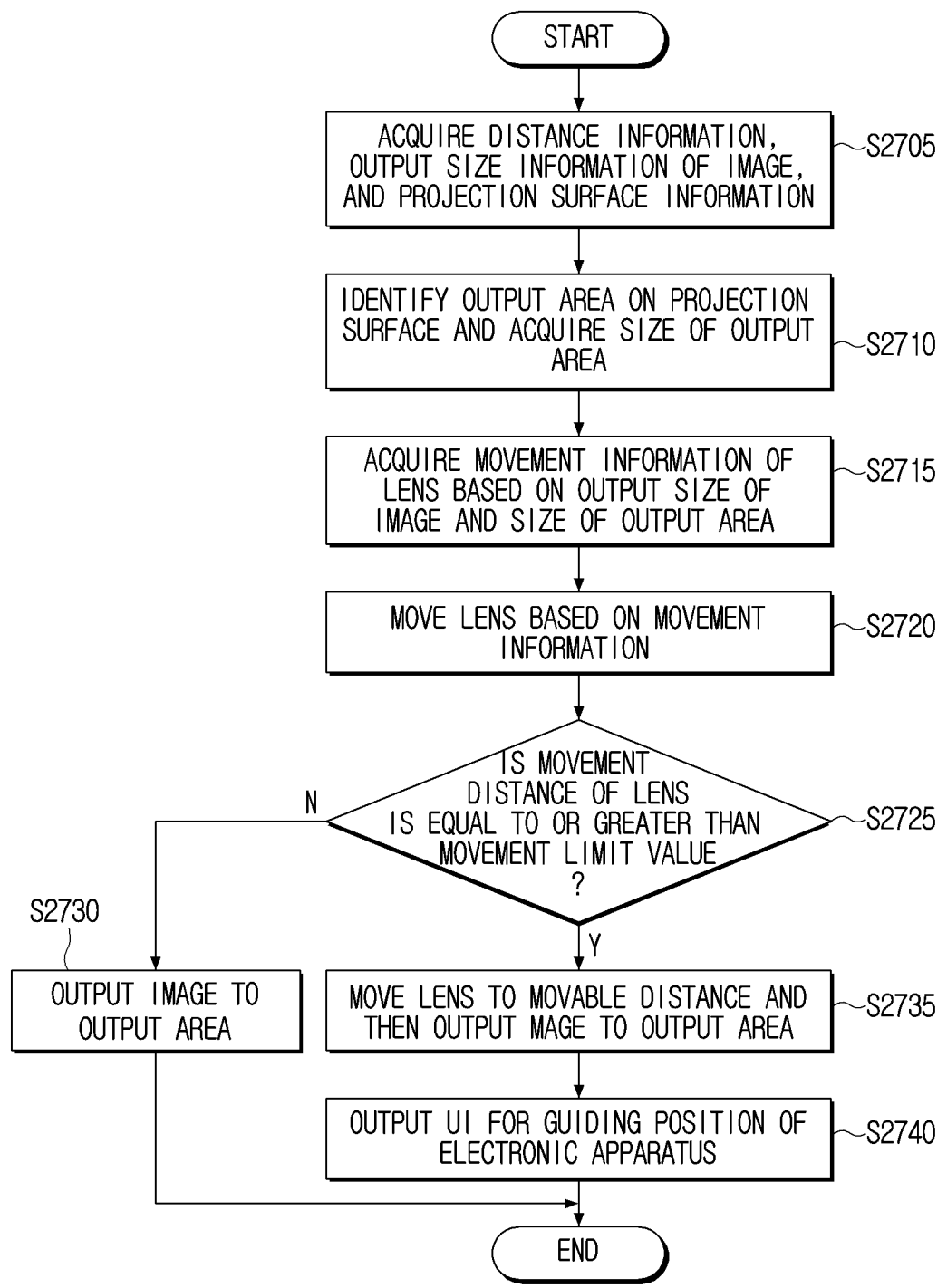
FIG. 27 is a flowchart for describing an operation of outputting an image in consideration of a movement limit value of a projection lens.

FIG. 27 is a flowchart for describing an operation of outputting an image in consideration of a movement limit value of a projection lens.

Referring to FIG. 27, the electronic apparatus 100 may acquire distance information, output size information of an image, and projection surface information (S2705). Then, the electronic apparatus 100 may identify an output area on a projection surface and acquire a size of the output area (S2710). Then, the electronic apparatus 100 may acquire movement information of the projection lens 110 based on an output size of the image and the size of the output area (S2715).

Then, the electronic apparatus 100 may move the projection lens 110 based on the movement information (S2720). Here, the movement information of the projection lens 110 may include at least one of a movement direction or a movement distance. Here, the electronic apparatus 100 may identify whether or not the movement distance of the projection lens 110 is equal to or greater than a movement limit value (S2725).

Here, if the movement distance of the projection lens 110 is less than the movement limit value (S2725-N), the electronic apparatus 100 may output an image to the output area identified in step S2710.

If the movement distance of the projection lens 110 is equal to or greater than the movement limit value (S2725-Y), the electronic apparatus 100 may move the projection lens 110 to a movable distance (distance to the movement limit value) and then output the image to the output area (S2735). Specifically, the electronic apparatus 100 may move the projection lens 110 to the movement limit value shorter than the movement distance. In addition, the electronic apparatus 100 may move the projection lens 110 as much as possible and then output the image through the moved projection lens 110.

Then, the electronic apparatus 100 may output a UI for guiding a position of the electronic apparatus 100 (S2740). In a situation in which the projection lens 110 may no longer be physically moved, the electronic apparatus 100 needs to be directly moved. Accordingly, the electronic apparatus 100 may guide the movement of the electronic apparatus 100 through the UI.

The user may move the electronic apparatus 100 through the output UI

Figure 28:
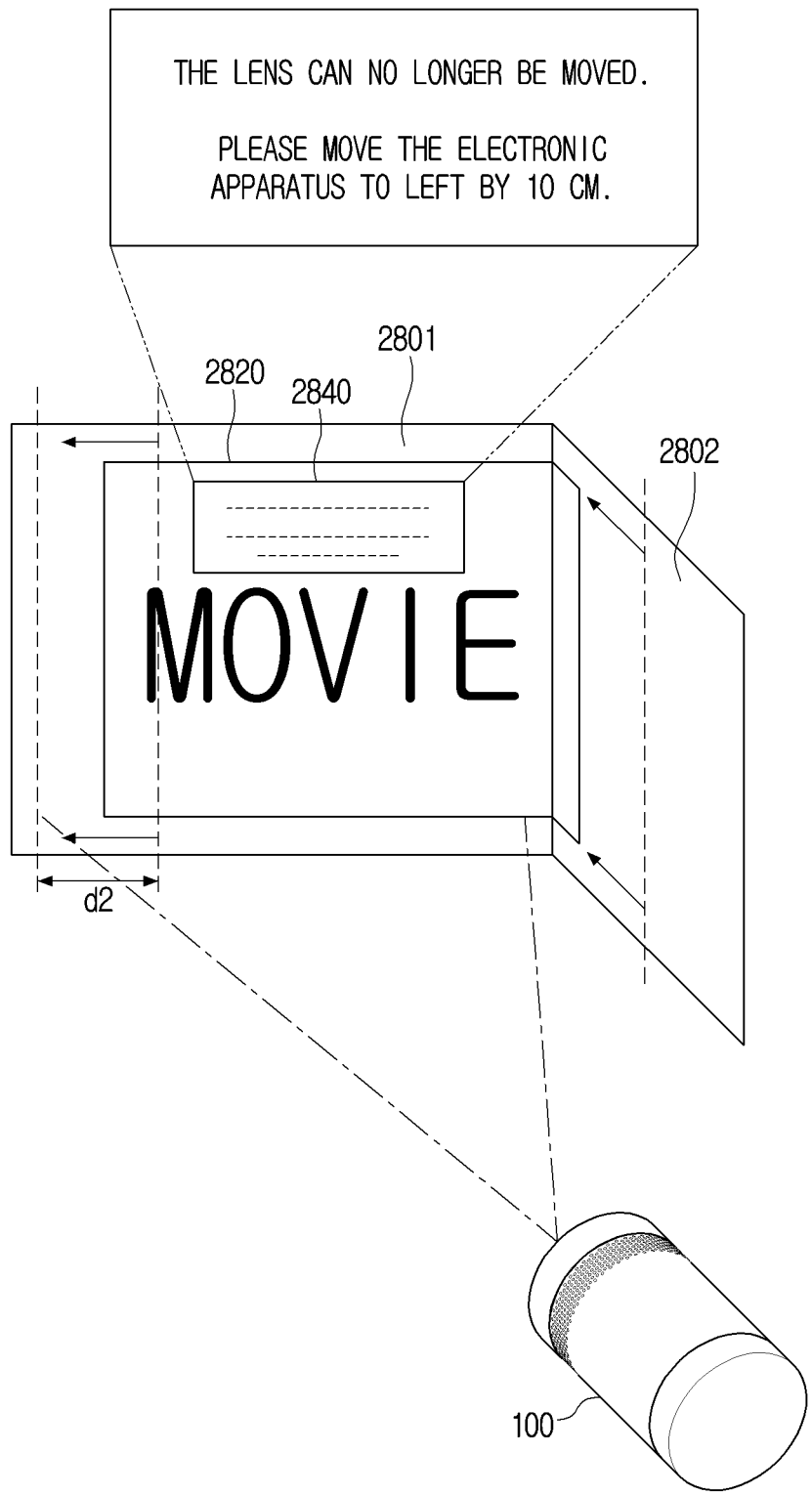
FIG. 28 is a view for describing a user interface (UI) displayed when the movement limit value of the projection lens is exceeded.

FIG. 28 is a view for describing a UI displayed when the movement limit value of the projection lens is exceeded.

Referring to FIG. 28, the electronic apparatus 100 may analyze a projection surface to divide the projection surface into a first area 2801 and a second area 2802. In addition, the electronic apparatus 100 may move an image to the left and output the moved image, similar to an embodiment of FIG. 24. Here, the electronic apparatus 100 may move the projection lens 110 to the left in moving the image to the left and outputting the moved image. However, in a situation in which a movement distance is greater than the movement limit value, the projection lens 110 may no longer be physically moved.

Here, the electronic apparatus 100 may move the projection lens 110 to the movement limit value and then output an image 2820. Here, the image 2820 may be an image output in a state at which it is moved up to a physical movement limit value of the projection lens 110 rather than a calculated movement distance d2. Accordingly, the image 2820 may still be output over the first area 2801 and the second area 2802.

Here, the electronic apparatus 100 may output a guide UI 2840. Here, the guide UI 2840 may include at least one of information for informing the user that the projection lens 110 may no longer be moved, a movement direction of the electronic apparatus 100, a movement distance of the electronic apparatus 100, or information requesting the user to move the electronic apparatus 100.

If the user moves the electronic apparatus 100 through the guide UI 2840, the electronic apparatus 100 may output an image moved by the calculated distance d2, and the output image may be displayed in a state in which it is not over a plurality of areas.

Figure 29:
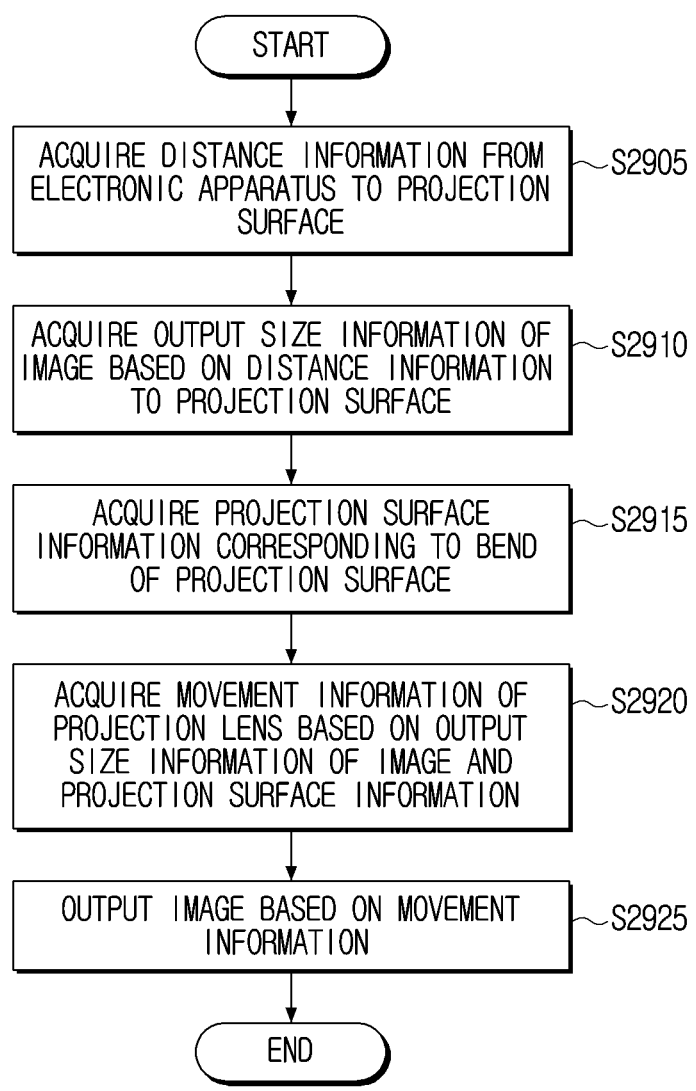
FIG. 29 is a flowchart for describing a controlling method of an electronic apparatus according to an embodiment of the disclosure.

FIG. 29 is a flowchart for describing a controlling method of an electronic apparatus according to an embodiment of the disclosure.

Referring to FIG. 29, a controlling method of the electronic apparatus 100 including the projection lens 110 for outputting an image to the projection surface includes acquiring distance information from the electronic apparatus 100 to the projection surface (S2905), acquiring output size information of the image based on the distance information to the projection surface (S2910), acquiring projection surface information corresponding to a bend of the projection surface (S2915), acquiring movement information of the projection lens 110 based on the output size information of the image and the projection surface information (S2920), and outputting the image based on the movement information (S2925).

Meanwhile, the movement information may include at least one of a movement direction or a movement distance, and the controlling method may further include moving the projection lens 110 based on the movement direction and the movement distance.

Meanwhile, the controlling method may further include identifying a bend position of the projection surface, dividing the projection surface into a first area and a second area based on the bend position, and identifying one of the first area or the second area as an output area, wherein in the outputting (S2925) of the image, the image is output to the identified output area.

Meanwhile, in the identifying of one of the first area and the second area as the output area, a size of the first area and a size of the second area may be acquired, and an area having a greater size, of the first area and the second area may be identified as the output area.

Meanwhile, in the identifying of one of the first area and the second area as the output area, the first area may be identified as the output area based on a size of a first portion of the image output to the first area being greater than a size of a second portion of the image output to the second area.

Meanwhile, the controlling method may further include acquiring a size of the output area and changing a size of the image based on the size of the output area, wherein in the outputting (S2925) of the image, the changed image is output to the output area.

Meanwhile, in the changing of the size of the image, the size of the image may be changed while maintaining an aspect ratio of the image.

Meanwhile, the controlling method may further include acquiring a size of the output area, enlarging the size of the image based on the size of the output area being greater than an output size of the image, and reducing the size of the image based on the size of the output area being smaller than the output size of the image.

Meanwhile, in the acquiring (S2920) of the movement information, movement information may be acquired based on a movement limit value corresponding to the projection lens 110, and the controlling method may further include outputting a user interface (UI) for guiding a position of the electronic apparatus 100 based on a movement distance included in the movement information being greater than the movement limit value.

Meanwhile, in the acquiring (S2920) of the movement information, it may be identified whether or not the image is output to both the first area and the second area based on a captured image acquired through the image sensor based on the projection surface including the first area and the second area, and the movement information of the projection lens 110 may be acquired based on the image being output to both the first area and the second area.

Meanwhile, the controlling method of an electronic apparatus as illustrated in FIG. 29 may be executed on the electronic apparatus having the components of FIG. 2A or 2B or may be executed on an electronic apparatus having other components.

Meanwhile, the methods according to the diverse embodiments of the disclosure described above may be implemented in the form of an application that may be installed in an existing electronic apparatus.

In addition, the methods according to the diverse embodiments of the disclosure described above may be implemented only by software upgrade or hardware upgrade for the existing electronic apparatus.

Further, the diverse embodiments of the disclosure described above may also be performed through an embedded server included in the electronic apparatus or an external server of at least one of the electronic apparatus or the display apparatus.

Meanwhile, according to an embodiment of the disclosure, the diverse embodiments described above may be implemented as software including instructions stored in a machine-readable storage medium (e.g., a computer-readable storage medium). A machine may be an apparatus that invokes the stored instruction from the storage medium and may operate according to the invoked instruction, and may include the electronic apparatus according to the disclosed embodiments. When a command is executed by the processor, the processor may directly perform a function corresponding to the command or other components may perform the function corresponding to the command under a control of the processor. The command may include codes created or executed by a compiler or an interpreter. The machine-readable storage medium may be provided in the form of a non-transitory storage medium. Here, the term 'non-transitory' means that the storage medium is tangible without including a signal, and does not distinguish whether data are semi-permanently or temporarily stored in the storage medium.

In addition, according to an embodiment of the disclosure, the methods according to the diverse embodiments described above may be included and provided in a computer program product. The computer program product may be traded as a product between a seller and a purchaser. The computer program product may be distributed in the form of a storage medium (e.g., a compact disc read only memory (CD-ROM)) that may be read by the machine or online through an application store (e.g., PlayStore™). In a case of the online distribution, at least portions of the computer program product may be at least temporarily stored in a storage medium such as a memory of a server of a manufacturer, a server of an application store, or a relay server or be temporarily created.

In addition, each of components (e.g., modules or programs) according to the diverse embodiments described above may include a single entity or a plurality of entities, and some of the corresponding sub-components described above may be omitted or other sub-components may be further included in the diverse embodiments. Alternatively or additionally, some of the components (e.g., the modules or the programs) may be integrated into one entity, and may perform functions performed by the respective corresponding components before being integrated in the same or similar manner. Operations performed by the modules, the programs, or other components according to the diverse embodiments may be executed in a sequential manner, a parallel manner, an iterative manner, or a heuristic manner, at least some of the operations may be performed in a different order or be omitted, or other operations may be added.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed:

1. An electronic apparatus comprising:
a memory configured to store an image;
a sensor part including a distance sensor;
a projection part including a projection lens configured to output the image onto a projection surface; and
a processor configured to:
acquire distance information from the electronic apparatus to the projection surface through the sensor part,
acquire output size information of the image based on the acquired distance information,
acquire, through the sensor part, information of the projection surface onto which the image is to be projected, the information of the projection surface including whether the projection surface has a bend,
acquire movement information of the projection lens based on the output size information of the image and the information of projection surface , the movement information being useable to move the projection lens so that the image is projected onto a portion of the projection surface based on the bend of the projection surface, and
control the projection part to output the image onto the projection surface based on the movement information,
wherein the movement information includes a movement direction and a movement distance for moving the projection lens,
wherein the processor is further configured to:
control the projection part to move the projection lens based on the movement direction and the movement distance, and
identify a position of the bend of the projection surface,
divide the projection surface into a first area and a second area based on the position of the bend of the projection surface,
identify the first area as an output area based on a size of a first portion of the image output onto the first area being greater than a size of a second portion of the image output onto the second area,
acquire a size of the output area,
change a size of the image to be projected onto the projection surface based on the size of the output area while maintaining an aspect ratio of the image, and
control the projection part to output the changed image onto the output area.

2. The electronic apparatus as claimed in claim 1, wherein the processor is configured to:
enlarge the size of the image based on the size of the output area being greater than an output size of the image, and
reduce the size of the image based on the size of the output area being smaller than the output size of the image.

3. The electronic apparatus as claimed in claim 1, wherein the processor is configured to:
acquire the movement information based on a movement limit value of the projection lens, and
control the projection part to output a user interface (UI) to guide through positioning of the electronic apparatus based on a movement distance included in the movement information being greater than the movement limit value.

4. The electronic apparatus as claimed in claim 1, wherein the sensor part includes an image sensor, and
the processor is configured to:
identify whether or not the image is output to both the first area and a the second area based on a captured image acquired through the image sensor based on the projection surface including the first area and the second area, and
acquire the movement information of the projection lens based on the image being output to both the first area and the second area.

5. A controlling method of an electronic apparatus including a projection lens to output an image to a projection surface, the controlling method comprising:
- acquiring distance information from the electronic apparatus to the projection surface;
- acquiring output size information of the image based on the acquired distance information;
- acquiring information of the projection surface onto which the image is to be projected, the information of the projection surface including whether the projection surface has a bend;
- acquiring movement information of the projection lens based on the output size information of the image and the information of projection surface, the movement information being useable to move the projection lens so that the image is projected onto a portion of the projection surface based on the bend of the projection surface; and
- outputting the image onto the projection surface based on the movement information,
- wherein the movement information includes a movement direction and a movement distance for moving the projection lens, and
- wherein the controlling method further comprises:
  - moving the projection lens based on the movement direction and the movement distance,
  - identifying a position of the bend of the projection surface,
  - dividing the projection surface into a first area and a second area based on the position of the bend of the projection surface,
  - identifying the first area as an output area based on a size of a first portion of the image output onto the first area being greater than a size of a second portion of the image output onto the second area,
  - acquiring a size of the output area,
  - changing a size of the image to be projected onto the projection surface based on the size of the output area while maintaining an aspect ratio of the image, and
  - wherein in the outputting of the image, outputting the changed image to the output area.

6. The controlling method as claimed in claim 5, further comprising:
- enlarging the size of the image based on the size of the output area being greater than an output size of the image, and
- reducing the size of the image based on the size of the output area being smaller than the output size of the image.

7. The controlling method as claimed in claim 5, wherein in the acquiring of the movement information, acquiring the movement information based on a movement limit value corresponding to the projection lens, and
- wherein the controlling method further comprising outputting a user interface (UI) to guide through positioning of the electronic apparatus based on a movement distance included in the movement information being greater than the movement limit value.

8. The controlling method as claimed in claim 5, wherein the acquiring of the movement information includes:
- identifying whether the image is output onto both the first area and the second area based on a captured image acquired through an image sensor based on the projection surface including the first area and the second area, and
- acquiring the movement information of the projection lens based on the image being output to both the first area and the second area.

* * * * *